(12) United States Patent  (10) Patent No.: US 8,868,660 B2
Hastings et al.  (45) Date of Patent: Oct. 21, 2014

(54) ELECTRONIC COMMUNICATION WORK FLOW MANAGER SYSTEM, METHOD AND COMPUTER PROGRAM PRODUCT

(75) Inventors: Roy J. Hastings, Duluth, GA (US); Randolph T. Torres, Clermont, FL (US); Kimberly T. Pamintuan, Tampa, FL (US); Teresa A. Linz, Canton, GA (US)

(73) Assignee: Cellco Partnership, Basking Ridge, NJ (US)

( * ) Notice: Subject to any disclaimer, the term of this patent is extended or adjusted under 35 U.S.C. 154(b) by 1092 days.

(21) Appl. No.: 11/386,259

(22) Filed: Mar. 22, 2006

(65) Prior Publication Data

US 2007/0226340 A1  Sep. 27, 2007

(51) Int. Cl.
 G06F 15/16 (2006.01)
 H04L 29/08 (2006.01)
 G06Q 10/00 (2012.01)

(52) U.S. Cl.
 CPC ............. G06Q 10/00 (2013.01); H04L 67/327 (2013.01); H04L 67/02 (2013.01); H04L 67/306 (2013.01)
 USPC .......... 709/206; 709/224; 379/9.03; 370/225; 707/708

(58) Field of Classification Search
 USPC ................. 709/206, 224; 379/9.03; 370/225; 705/9; 707/3
 See application file for complete search history.

(56) References Cited

U.S. PATENT DOCUMENTS

| | | | | |
|---|---|---|---|---|
| 5,206,903 A | * | 4/1993 | Kohler et al. | 379/265.12 |
| 5,309,513 A | * | 5/1994 | Rose | 379/265.12 |
| 5,335,269 A | * | 8/1994 | Steinlicht | 379/266.05 |
| 5,369,570 A | * | 11/1994 | Parad | 705/8 |
| 5,535,322 A | * | 7/1996 | Hecht | 705/1 |
| 5,590,188 A | * | 12/1996 | Crockett | 379/265.02 |
| 5,715,453 A | * | 2/1998 | Stewart | 715/207 |
| 5,812,529 A | * | 9/1998 | Czarnik et al. | 370/245 |
| 5,878,398 A | | 3/1999 | Tokuda et al. | |
| 5,893,128 A | * | 4/1999 | Nauckhoff | 715/210 |
| 5,920,697 A | * | 7/1999 | Masters et al. | 709/219 |
| 5,966,434 A | * | 10/1999 | Schafer et al. | 379/201.01 |
| 5,999,610 A | * | 12/1999 | Lin et al. | 379/207.02 |
| 5,999,911 A | | 12/1999 | Berg et al. | |
| 6,014,134 A | * | 1/2000 | Bell et al. | 715/705 |
| 6,032,184 A | * | 2/2000 | Cogger et al. | 709/223 |
| 6,233,602 B1 | * | 5/2001 | Van Venrooy et al. | 709/203 |
| 6,253,369 B1 | * | 6/2001 | Cloud et al. | 717/136 |
| 6,310,889 B1 | * | 10/2001 | Parsons et al. | 370/466 |
| 6,389,403 B1 | | 5/2002 | Dorak, Jr. | |
| 6,389,426 B1 | * | 5/2002 | Turnbull et al. | 707/102 |
| 6,411,947 B1 | * | 6/2002 | Rice et al. | 706/47 |
| 6,430,602 B1 | * | 8/2002 | Kay et al. | 709/206 |
| 6,587,837 B1 | | 7/2003 | Spagna et al. | |
| 6,728,752 B1 | * | 4/2004 | Chen et al. | 709/203 |
| 6,738,911 B2 | * | 5/2004 | Hayes | 726/25 |
| 6,832,201 B1 | * | 12/2004 | Leymann et al. | 705/7 |
| 6,832,203 B1 | * | 12/2004 | Villena et al. | 705/8 |
| 6,895,388 B1 | | 5/2005 | Smith | |

(Continued)

*Primary Examiner* — Thu Ha Nguyen
*Assistant Examiner* — Anthony Fabbri

(57) ABSTRACT

The present invention provides systems, methods and a computer program product for the management of electronic work items by providing uniform methodology across an enterprise. Work items are electronically received by an organization and routed to available users depending upon the business rules of the organization and certain parameters of the work items. Service level commitments may be assigned, tracked and reported as capturing standard reporting across the enterprise specifically with respect to electronic work items.

22 Claims, 28 Drawing Sheets

(56) References Cited

U.S. PATENT DOCUMENTS

| | | |
|---|---|---|
| 6,917,610 B1 * | 7/2005 | Kung et al. .................... 370/352 |
| 6,965,865 B2 | 11/2005 | Pletz et al. |
| 6,980,963 B1 | 12/2005 | Hanzek |
| 7,027,463 B2 * | 4/2006 | Mathew et al. ............... 370/463 |
| 7,058,587 B1 * | 6/2006 | Horne ............................... 705/7 |
| 7,110,525 B1 * | 9/2006 | Heller et al. ............. 379/265.11 |
| 7,225,230 B1 * | 5/2007 | Knoerle et al. ............... 709/206 |
| 7,269,253 B1 * | 9/2007 | Wu et al. .................. 379/265.11 |
| 7,366,460 B2 * | 4/2008 | O'Farrell et al. ............ 455/3.06 |
| 7,389,340 B2 * | 6/2008 | Kasvand et al. ............. 709/224 |
| 7,421,475 B2 * | 9/2008 | Pyle et al. .................... 709/206 |
| 7,523,165 B2 * | 4/2009 | Gourraud ...................... 709/206 |
| 7,529,680 B2 * | 5/2009 | Sunday et al. .................... 705/1 |
| 7,536,437 B2 * | 5/2009 | Zmolek ......................... 709/206 |
| 7,747,705 B1 * | 6/2010 | Raja .............................. 709/219 |
| 7,945,469 B2 * | 5/2011 | Cohen et al. ................. 705/7.14 |
| 8,028,087 B2 * | 9/2011 | Reed et al. .................... 709/238 |
| 8,059,548 B1 * | 11/2011 | Bisarya ......................... 370/242 |
| 2002/0023144 A1 * | 2/2002 | Linyard et al. ................ 709/218 |
| 2002/0073364 A1 * | 6/2002 | Katagiri et al. ................. 714/48 |
| 2002/0087520 A1 * | 7/2002 | Meyers ............................. 707/3 |
| 2002/0107905 A1 * | 8/2002 | Roe et al. ..................... 709/202 |
| 2002/0124070 A1 * | 9/2002 | Pulsipher ...................... 709/223 |
| 2002/0128891 A1 * | 9/2002 | McSherry ......................... 705/8 |
| 2003/0110228 A1 * | 6/2003 | Xu et al. ....................... 709/207 |
| 2004/0078105 A1 * | 4/2004 | Moon et al. ................... 700/100 |
| 2004/0078777 A1 * | 4/2004 | Bahrami ....................... 717/105 |
| 2004/0224674 A1 * | 11/2004 | O'Farrell et al. ............. 455/418 |
| 2005/0021836 A1 * | 1/2005 | Reed et al. .................... 709/238 |
| 2005/0044164 A1 * | 2/2005 | O'Farrell et al. ............. 709/213 |
| 2005/0044165 A1 * | 2/2005 | O'Farrell et al. ............. 709/213 |
| 2005/0114448 A1 * | 5/2005 | Skomra ......................... 709/204 |
| 2006/0262922 A1 * | 11/2006 | Margulies et al. ....... 379/265.12 |
| 2007/0038499 A1 * | 2/2007 | Margulies et al. ................ 705/9 |
| 2007/0226310 A1 * | 9/2007 | Shaffer et al. ................ 709/207 |

* cited by examiner

Add User

User ID

Password

Team [ABAPTISTE]

Role [Administrator]

User Active Status [Active]

Home Number

Work Number

Work Extension

FAX

Email

Cellular

Pager

[Add User] [Cancel]

First Name

Last Name

Middle Init

Prefix

Suffix

Contact Type

Title

Department

Manager Name

Consultant

Temporary

Consultant End Date (mm/dd/yyyy)

Temporary End Date (mm/dd/yyyy)

ELECTRONIC COMMUNICATION WORK FLOW MANAGER SYSTEM, METHOD AND COMPUTER PROGRAM PRODUCT

BACKGROUND OF THE INVENTION

The present invention relates to electronic communications and in particular to the management of electronic communications.

BRIEF SUMMARY OF THE INVENTION

Within many organizations, email is a continuous form of communication by which orders are placed, requests are made, and services are described. The present invention provides a solution for the management of offline work, while increasing productivity of customer service representatives, monitoring service levels per email type and includes capturing standard reporting across the enterprise specifically with respect to that offline work. The embodiments of this invention provide uniform methodology for offline work, therefore further distributing a standard business model across the enterprise.

One aspect of the present invention is the ability to monitor email mailboxes within an organization, and assign units of work to a customer service representative who is logged on and available to work emails.

Another aspect of the present invention is the ability to route emails to the correct, center, team and a customer service representative in that team within an organization.

Yet another aspect of the present invention is the ability to monitor each received email and the service level associated with that email. Any emails in jeopardy of meeting their service level or have missed their service level can be quickly located via a hot key. This aspect helps organizations maintain established service levels with customers.

Another aspect of the present invention is the ability to provide auto acknowledgement back to the end-user at various stages of the email. For example, the system of the present invention will send an end user an auto acknowledgement upon receipt of an email. In one embodiment this acknowledgement is a template that has been approved by a business team of an organization.

Yet another aspect of the invention allows an organization's business team to send emails or standard templates back to the end user—and maintains the relationship of any additional emails sent to the original email. These standard templates are defined within the embodiments of the present invention and allow customer service representatives within the same team to send identical templates, thereby instituting standard processes across the organization.

Another aspect of the present invention is the ability to provide flexibility within the routing rules, the individuals that work specific types of emails, the status of the emails, the service levels associated, etc.

Yet another aspect of the present invention is the ability to maintain a relationship between any orders sent, and any related emails.

Another aspect of the invention is the ability of the system of the present invention to allow a user to access real-time a history of emails or orders, for example 13 months of past emails or orders are maintained online.

Yet another aspect of the present invention is ability to allow for overflow work, in that each customer service representative can be assigned to a first team (e.g., a home team) and a second team (e.g., a visitor team). If there are no emails to be assigned within their home team, they may receive emails from the visitor team. This allows for effective email distribution and disaster planning.

Another aspect of the present invention is the ability to generate a standard set of real time statistics as well as batch reports on a time-specific basis such as, for example, daily, monthly or weekly. This reporting may be generated at various hierarchical levels such as center, team and user level. The reporting provides a standard set of reports across the organization, thereby further instituting a standard business process. Some of the reporting offered includes but is not limited to: average age of emails in the queue; oldest email in the queue; number of emails waiting to be assigned; average number of emails processed per hour; total emails completed per team; average handle time per customer service representative; number of emails worked per customer service representative; daily service levels; etc.

These and other aspects of the present invention are described more fully herein.

BRIEF DESCRIPTION OF THE SEVERAL VIEWS OF THE DRAWING(S)

The accompanying drawings, which are incorporated in and constitute a part of this specification, illustrate embodiments of the invention and, together with a general description of the invention given above, and the detailed description of the embodiments given below, serve to explain the principles of the invention:

FIG. 7 is an exemplary screen that may be used to perform administrative functions for a team in an embodiment according to the present invention;

FIG. 8b is an exemplary screen that may be used to enter correspondence template text in an embodiment according to the present invention;

FIG. 10 is an exemplary administrative screen for entering and establishing user information including the user's assigned team, role, and whether the user is an active user into an embodiment according to the present invention;

FIGS. 14a and 14b are exemplary screens that allow the performance of searches for orders, emails and other work items in an embodiment according to the present invention;

FIG. 16 is an exemplary screen that is displayed by the GUI and allows a user see emails, orders and other pieces of work in jeopardy of not meeting their service level commitment, in an embodiment according to the invention;

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Block Diagrams, Flow Charts and Computer Program Product

The present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Computer and Computer Hardware

Figure 1A:
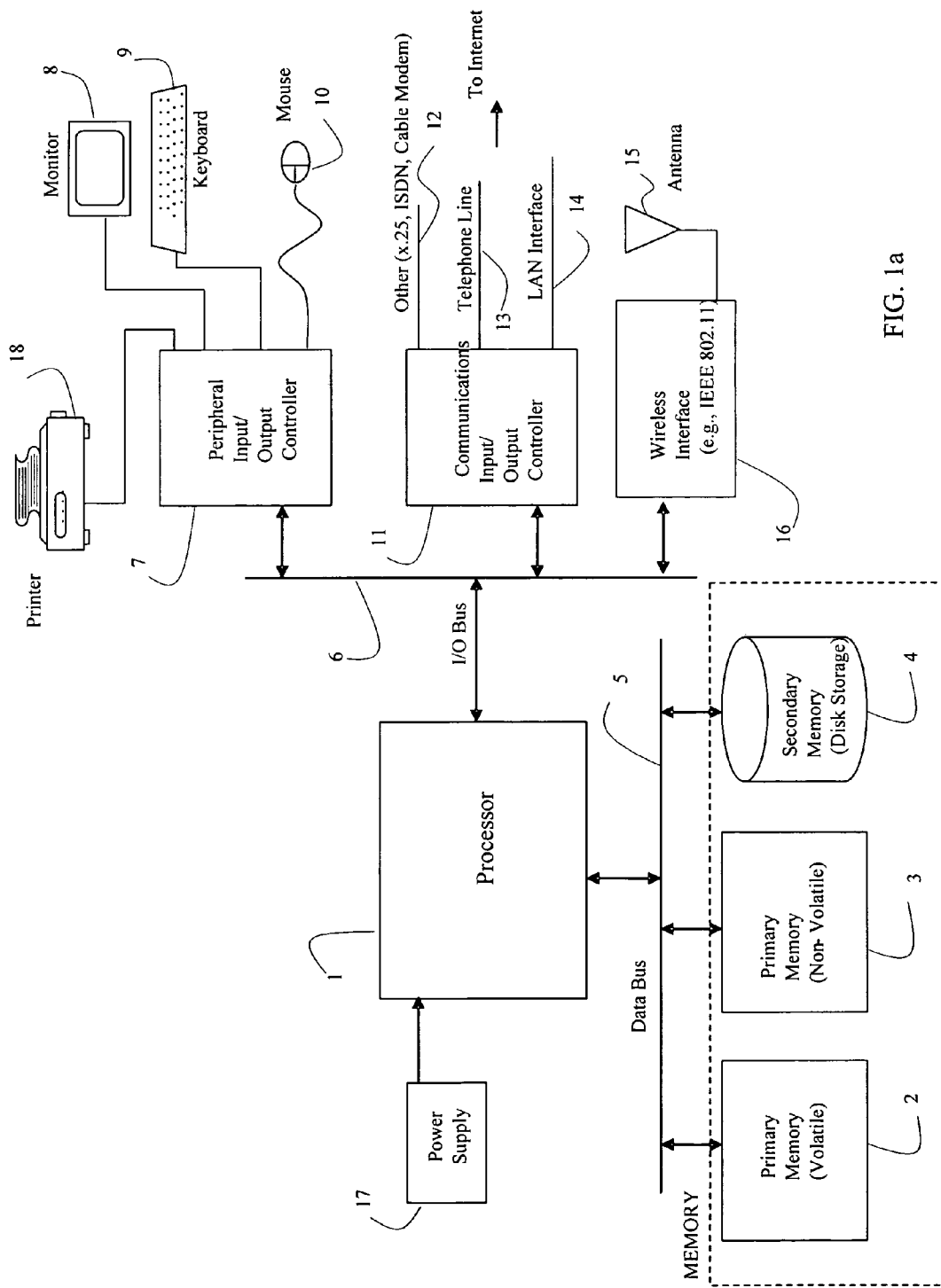
FIG. 1a is an illustration of an embodiment of a computer that can be used to practice aspects of the present invention.

In several of the embodiments of the invention referenced herein, a "computer" or "computing device" is referenced. The computer may be, for example, a mainframe, desktop, notebook or laptop, hand-held, hand held device such as a data acquisition and storage device, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16, 32, 64 or more bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, cellular (Advanced Mobile Phone Service or "AMPS"), Personal Communication Services (PCS), or a standard 3G wireless telecommunications protocols, such as CDMA2000 1×EV-DO, GPRS, W-CDMA, or other protocol.

Figure 1B:
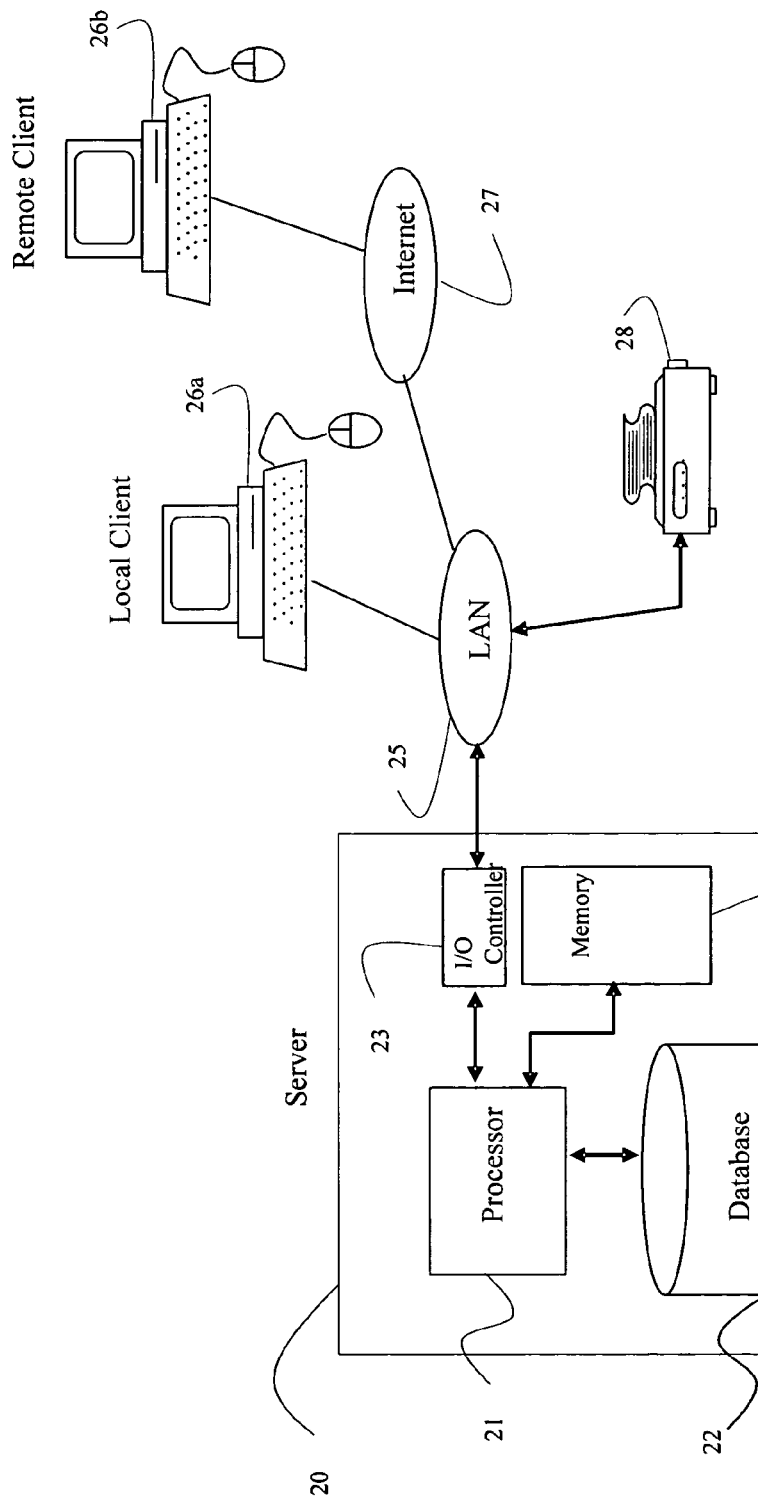
FIG. 1b is an alternative embodiment of the processing system of FIG. 1a that also may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible such as, for example, the handheld devices contemplated herein and can be used to practice the principles of the present invention. The embodiments illustrated in FIGS. 1a and 1b can be modified in different ways and be within the scope of the present invention as claimed.

Overview and System Description

The embodiments according to the present invention provide a tool to manage work by distributing pieces of work to one or more centers, teams and customer service representatives. A piece of work is generally an email or an order, but may be any task associated with a work flow. Once a customer service representative (CSR) receives a piece of work, the CSR fulfills' the order or the email in a respective point of sale system or otherwise takes some action on the task. In addition to distribution of work, embodiments according to the present invention offers other services for a business enterprise including: distributing orders and emails placed to customer service representatives according to business rules or in a formulaic manner; tracking correspondence with respect to emails, orders and other pieces of work; allowing a user to view attachments, attachments within attachments, etc. that are associated with emails, orders, and other pieces of work; providing quick access to near real-time statistics on work items; providing standard templates for the customer service representatives to use in responding to customers; providing overflow ability across teams; providing extensive search functionalities; providing an ability to export search results to other programs (e.g., spreadsheets, databases, etc.) for further analysis; providing system administrative functions which allow business teams to build their own routing rules for the team, build their own routing rules for order types, and set up their own correspondence; automatically acknowledge that emails were received; automatically acknowledge orders, emails, and pieces of work at different stages of the work items life (open, completed, cancelled, deposit required, etc.); allowing users outside of a business organization to submit orders using a web page—which are then routed according to the business rules; establishing new users with their proper authority, role, functions, etc. retaining order/email history online for a designated period of time (e.g., 13 months), then is archived and can be retrieved with a request; and providing a standard set of reports reflecting daily, weekly and monthly activity.

Figure 2:
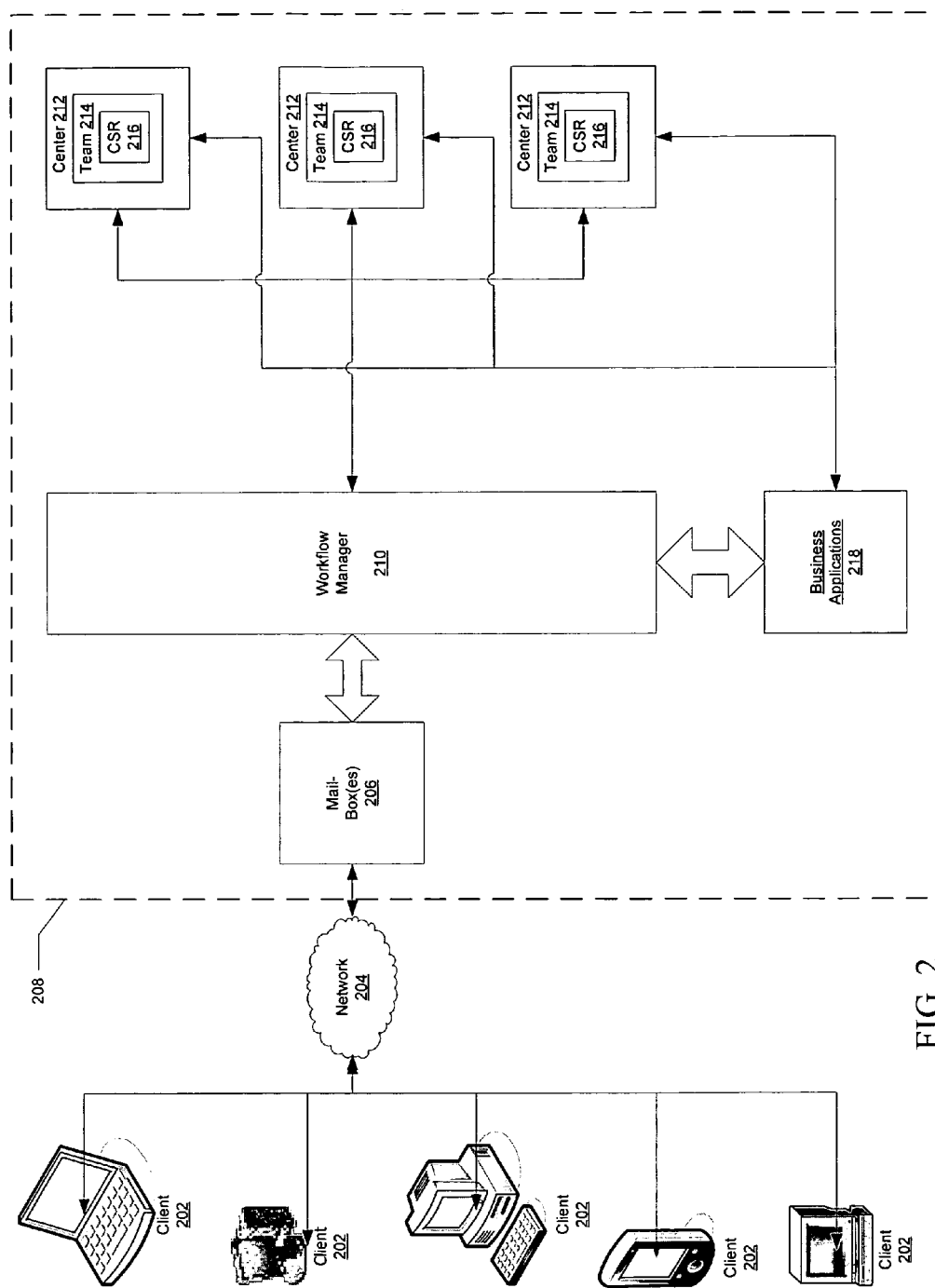
FIG. 2 is an exemplary block diagram of an embodiment according to the invention.

As described above and as illustrated in FIG. 2, clients 202 transfer work pieces over a network 204 to one or more electronic mailboxes 206 of a business 208. The work pieces are then retrieved from the electronic mailboxes 206 by a workflow manager 210. Work pieces received by the workflow manager 210 include email and orders. Emails are correspondence from customers sent to one or more electronic mailboxes 206 of the business organization 208. Without the workflow manager 210, customer service representatives may selectively work the pieces of mail, and perhaps select only those more desirable/easier to work, etc.

The embodiments according to the present invention monitor the business organization's mailboxes 206, and as emails come into the mailbox 206, the workflow manager 210 distributes the emails to a center 212, team 214 and available customer service representative (CSR) 216. Generally, a CSR 216 belongs to a team 214 that belongs to a center 212. The distribution is based, in some instances, upon the service level commitment date of the type of email. That is, if two different email types come into the mailbox 206 at the same time, the workflow manager 210 will ensure that an email that is assigned a service level that corresponds to a quicker or shorter response time is distributed to an available representative 216 first. In addition, many productivity statistics are generated both in near real-time and in batch to provide an organization's management with a view of the productivity levels of center 212, teams 214 and customer service representatives 216.

Email assignment occurs when a piece of email is retrieved from one of the organization's mailboxes 206 and enters the workflow manager 210. The WFM 210 tries to assign the email to a specific center and team based upon business rules. The business can control how they want to assign the email using the business rules. That is, emails can be routed in at least the following ways: the WFM 210 can send the email to a specific center 212 or team 214 based upon the name of the mailbox in which the email was received; the WFM 210 can check a corporate profile database for the email domain and route the email to the center 212 and team 214 specified in the corporate profile database; the business can key in routing rules, which the WFM 210 will read and then route the piece of mail to the center 212, team 214, or CSR 216 determined by individual routing rules; if the WFM 210 still cannot determine the center 212, team 214, or CSR 216 based upon the above-described conditions, the WFM 210 places the email in an unidentified queue, which will then will be responded to by an assigned business team. The assigned business team then assigns this piece of mail, and builds routing rules to avoid similar emails falling to the unidentified queue.

When the WFM 210 receives an email, which requires attention from a customer service representative 216, the CSR 216 is made aware of the email by, for example, a message that is displayed on a display alerting the CSR 216 of the email. In one embodiment according to the present invention, when the received email is opened the CSR 216 is presented one or more screens with various details and options, which may include: the email's message body, including any prior emails that have been replied to by the business organization in order to provide a history of the interaction between the customer and the business organization; any attachments, which may be organized under an attachment tab, and can generally be any type of electronic document that may be attached to an email as are known in the art; any outgoing emails that have been sent from the business organization to the originator of the email as a result of the original email; any related emails (other incoming or outgoing emails that are related to this same emails), which may include the actual emails or electronic "links" to the emails; a tracking history, which shows a log of any status changes to the original email (e.g., "open," "completed," "pending," etc.); orders related to the email, for instance, if as a result of this email, the customer service representative needed to do a price plan change on a mobile communications device, then the CSR would access the provider's point of sale system, perform the price plan change, then the order related to the email would be displayed or linked to the email; notes, which may include any special notes the customer service representative wants to add to the email. Furthermore, in an embodiment according to the invention an email is assigned a service level commitment upon receipt by the WFM (discussed in further detail herein). If the email has missed its service level, or is in jeopardy of missing its service level the customer service representative can easily see this by, for example, an icon or color coding or some other means of identifying the risk level of the email.

Figure 3:
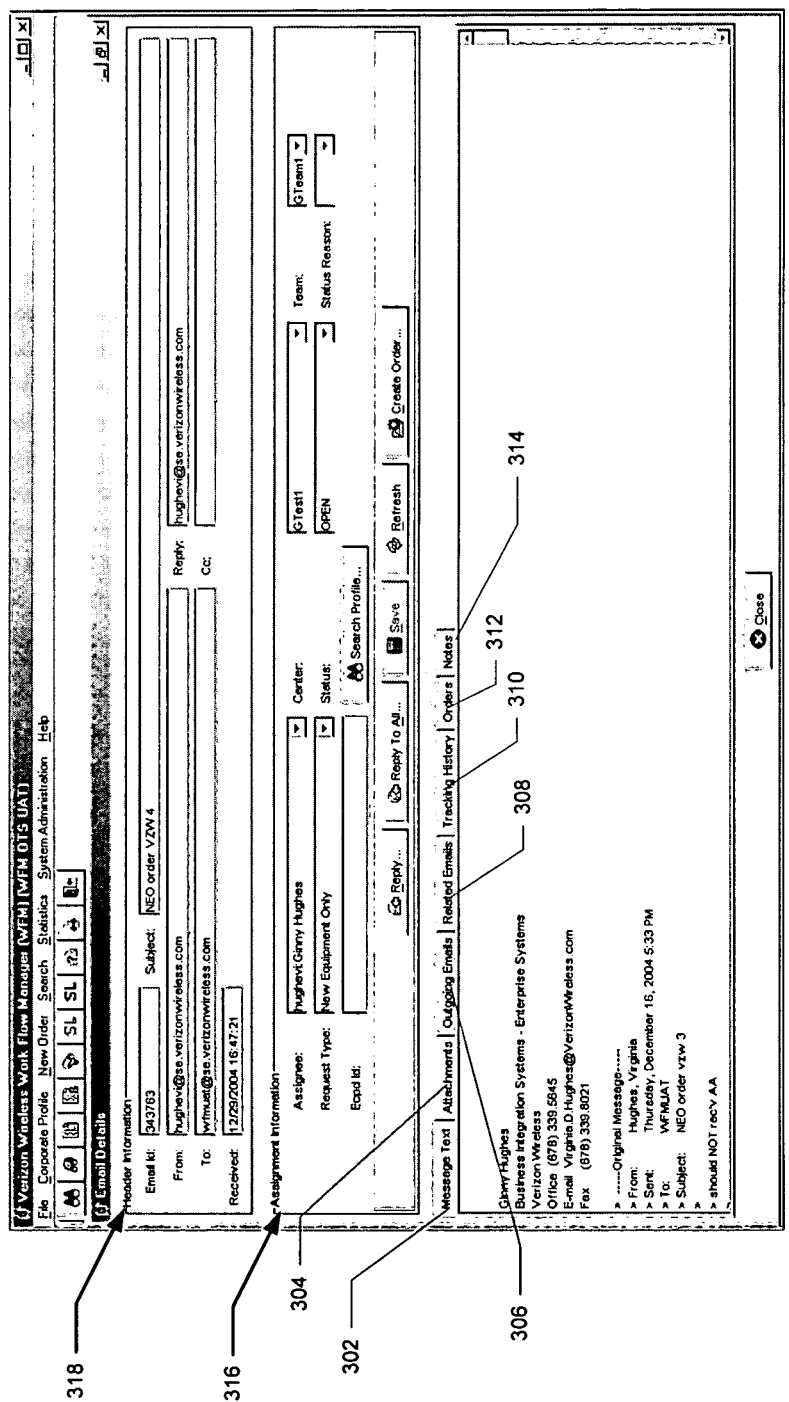
FIG. 3 is an exemplary embodiment of a screen that is displayed by a graphical user interface in a display device for processing a work item comprised of an email.

An exemplary embodiment of the above described one or more screens that are displayed by a graphical user interface in a display device for processing a work item comprised of an email is shown in FIG. 3 and has "tabs" for the message body 302, attachments 304, outgoing emails 306, related emails 308, tracking history 310, orders 312, and notes 314. The screen also has an "assignment" section 316 that provides information about whether the work item has been assigned to someone for further processing and, if so, information about to whom it has been assigned and status information about the work item. This embodiment of a screen allows anyone on an organization's business team, whether they worked the original email or not, to be able to see related correspondence, orders and any notes. Additionally, from this exemplary screen, if the customer service representative 216 needed more information from the customer, they can compose an email that is directed back to the originator of the original email. It is to be appreciated that embodiments of the WFM 210 according to the present invention are capable of monitoring one or more email mailboxes 206 that are associated with a business organization.

Referring back to FIG. 2, another piece of work that may be received by a mailbox 206 monitored by the WFM 210 is an order. Orders may be received into WFM 210 from several sources including: a website of the business organization; from b2b and b2c web agents such as, for example, VZW.com, InPhonics, Amazon, UPS, etc.; and business ordering systems internal to the business organization (i.e., business applications 218).

In one embodiment, the WFM 210 monitors orders that have entered the WFM 210 in a FAILED state. That is, the order has failed and has not been able to be provisioned for the customer. When an order fails, the WFM 210 distributes the order to a center 212, team 214 and available customer service representative 216. The distribution is based upon the service level commitment date of the type of order, that is, the WFM 210 will ensure that an order with a higher priority is distributed to an available representative first. In addition, productivity statistics are generated both real-time and in batch to provide an organization's management team with a view of the productivity levels of centers 212, teams 214 and representatives 216. Orders may be received in various formats including, for instance, ASCII text, HTML and XML.

XML may be used to transmit orders requesting, for example, a communications device and a service plan. The XML format allows multiple sources to send a standard message format, which is then processed and loaded into WFM.

If an order is received by the WFM 210, distributed to an order management system (i.e., a business application 218) and the order is successfully provisioned, that is, no errors occurring during order processing by the business's order management system, the order is returned to the WFM 210 in a COMPLETED status. No further action is required by the customer service representative 216, yet the order is in a place, where it can be queried if there are any questions and it is available for all standard reporting. If the order is not successfully provisioned, for instance there were errors of any type in fulfilling the order, the order is sent to the WFM 210 with a FAILED status, as described above, and at that point the order is assigned to a center 212, team 214, or CSR 216 to determine what the errors were and complete processing of the order.

When an order enters the WFM 210, the WFM 210 attempts to assign the order to a center 212, team 214, or CSR 216. The business organization has some flexibility as to what center 212, team 214, or CSR 216 an order is assigned to and may establish business rules for guiding the WFM 210 in assignment of orders. For instance, if an order has a corporate ID associated with it, the WFM 210 will determine the corporation associated with the ID via a corporate profile and determine whether to route the order to the center 212 or team 214 that is defined on that corporate profile, or whether to route the order to a special template built for this extranet. If the corporate profile clarifies to route the order to the center 212 and team 214 on the profile, the WFM 210 will react accordingly. If the corporate profile clarifies to route the order to the template, the WFM 210 will route the order to the specific template, which has been built by the business for the identified corporation. This template has the flexibility of routing by source of the order, the type of order and the Internet market for the order to designated centers 212, teams 214, or CSRs 216. If the WFM 210 cannot find a template to route the order by, the WFM 210 will route the order to an unidentified queue, which then will be responded to by an assigned business team. The business team will then assign this order, and build the specific template to handle subsequent order routing. If the order is not associated with a corporate ID, the WFM 210 will look for a specific template by market to route this order. Templates are generally built by source of the order, the type of order and the Internet market for the order. Once received by a center 212, team 214 and CSR 216, work items are processed, which may require interaction with other business applications 218 such as, for example, order provisioning systems. Users may also reassign work items, correspond with customers and clients 202, create tracking orders that monitor the status of a client's order, and view various statistics and reports of work performance through the functionality of the workflow manager 210.

Figure 4:
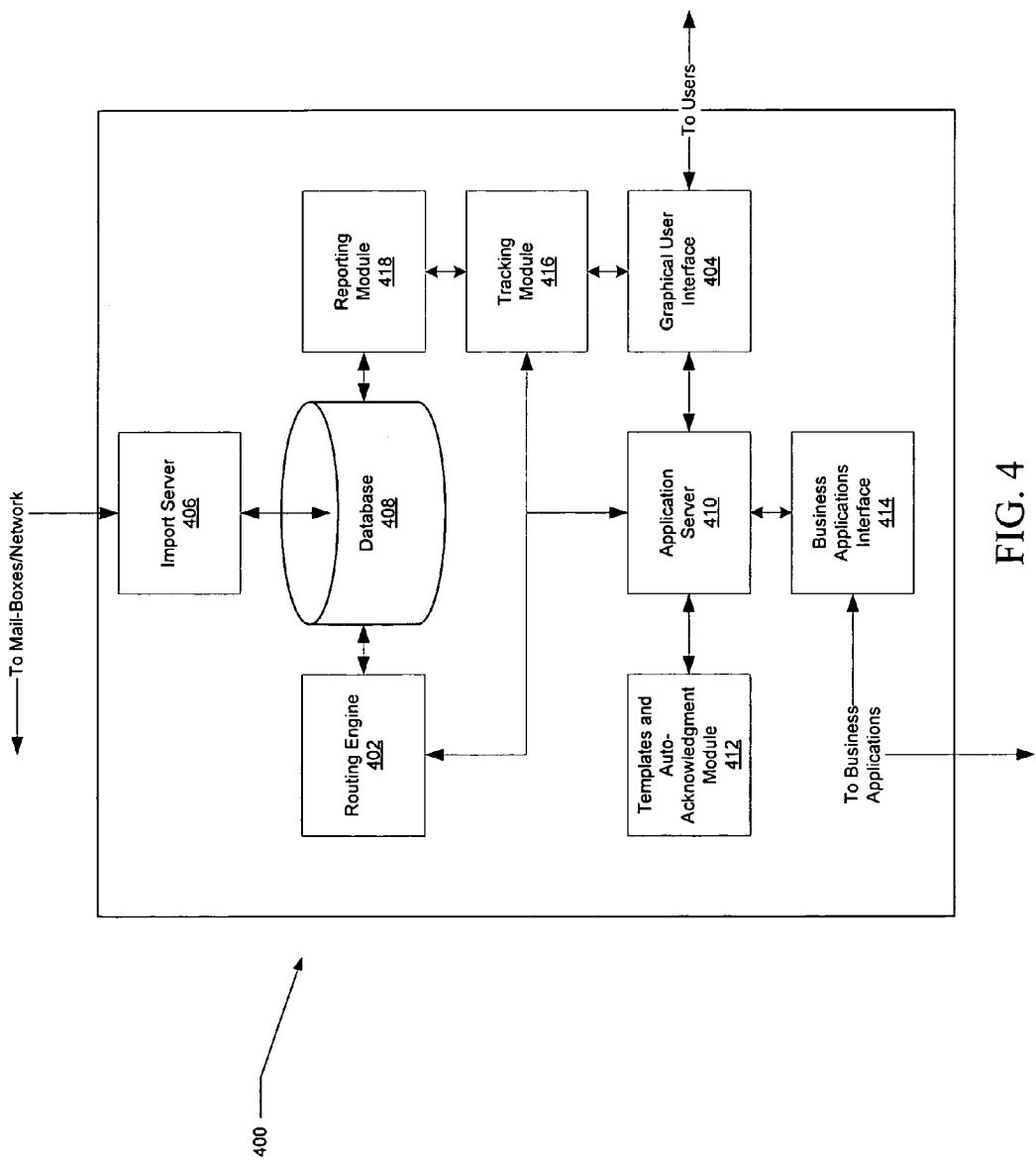
FIG. 4 is an exemplary embodiment of a workflow manager and components or modules that comprise this embodiment.

FIG. 4 is an exemplary embodiment of a workflow manager 400 and components or modules that comprise this embodiment. Work items are retrieved from an organization's one or electronic mailboxes, by direct XML or http interfaces, from other business applications, or by other means by an import server 406. Work items are then routed by the import server 406 to a database 408, where they are stored. In one embodiment the database is an Oracle database, though other databases are contemplated under the scope of this invention. Work items are retrieved from the database 408 by a routing engine 402. The routing engine 402 is responsible for distributing work items across the organization and between business applications in accordance with business rules and algorithms. Business rules for routing work items may be implemented according to center 212, team 214, or CSR 216, which allows flexible routing of work items. A work items is not routed to any center 212, team 214, or CSR 216 that is unavailable or inactive. The routing engine 402 tracks the availabilities of centers, teams and CSRs that are associated with the WFM 400. Work item routing may depend upon whether the work item is an order, email or some other form of work. Routing may also be affected by the service level commitment assigned to a piece of work as those with higher priority will be routed before those with a lower priority.

Work items are routed to a designated center, team or CSR through an application server 410, as such routing is determined by the business's routing rules. The application server 410 services a graphical user interface (GUI) that facilitates the WFM's 400 interaction with centers, teams and CSRs through graphical displays.

The graphical user interface (GUI) 404 provides an interface for a routed work item to be handled by a center, team, CSR. Work items that are routed by the routing engine 402 are displayed to a center, team, CSR through the GUI 404, though it is to be appreciated that the GUI 404 may display additional information other than the work item. Details about information displayed in the GUI 404 are controlled by the application server 410. Generally, all interaction between a center, team or CSR and the WFM is provided through the GUI 404. The GUI 404 may be configured to operate on various platforms and computing devices such as, for example, desktop computers, terminals, laptops, and handheld wireless devices including mobile telecommunications terminals. In one embodiment the GUI 404 is Java based, though other object-oriented programming languages are contemplated under the scope of this invention for creating the GUI.

Other modules and components that comprise the WFM 400 includes a templates and auto-acknowledgment module 412, a business applications interface module 414 for interfacing the WFM 400 with other business applications, and tracking 416 and reporting 418 modules. The tracking module 416 tracks work items as they enter the WFM 400 and are processed. It may also interface with the reporting module 418 and/or the business application interface module 414 for providing tracking information to applications residing external to the WFM 400. The reporting module 418 provides statistical and other forms of reporting to monitor the efficiency and other parameters of the WFM 400, and centers, teams and CSRs. It is to be appreciated that while the modules and components of FIG. 4 are shown as separate and discrete entities, they may in fact be comprised of singular software, firmware, hardware or combinations thereof, whereas the modules and components of FIG. 4 represent at least some the functions performed by the WFM 400. The modules and servers of FIG. 4 are also not required to execute on the same computing devices and may operate on one or more computing devices as such devices are described in FIGS. 1a and 1b.

Accessing the WFM System

Figure 5A:
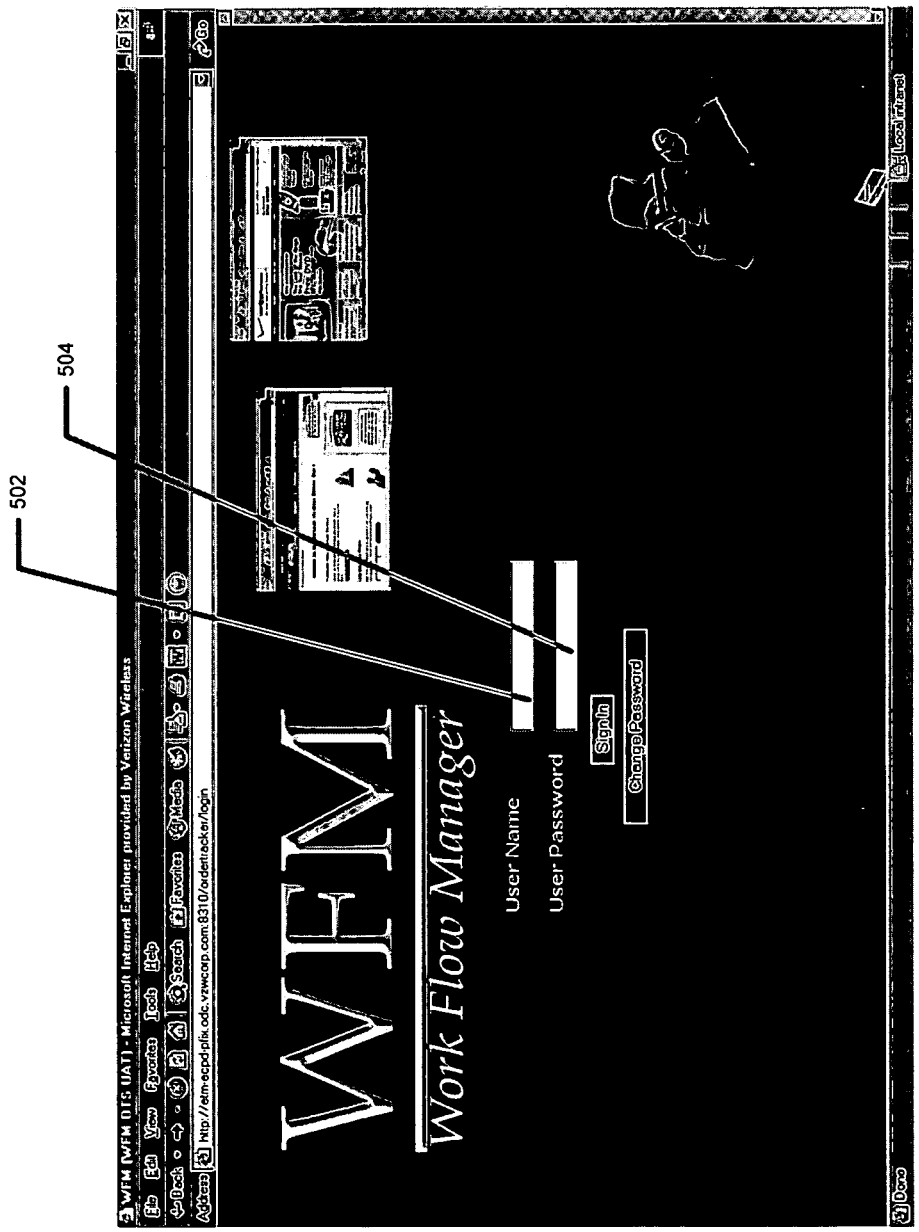
FIG. 5a is an exemplary screen that is displayed when launching a workflow manager application in an embodiment according to the present invention.
Figure 5B:
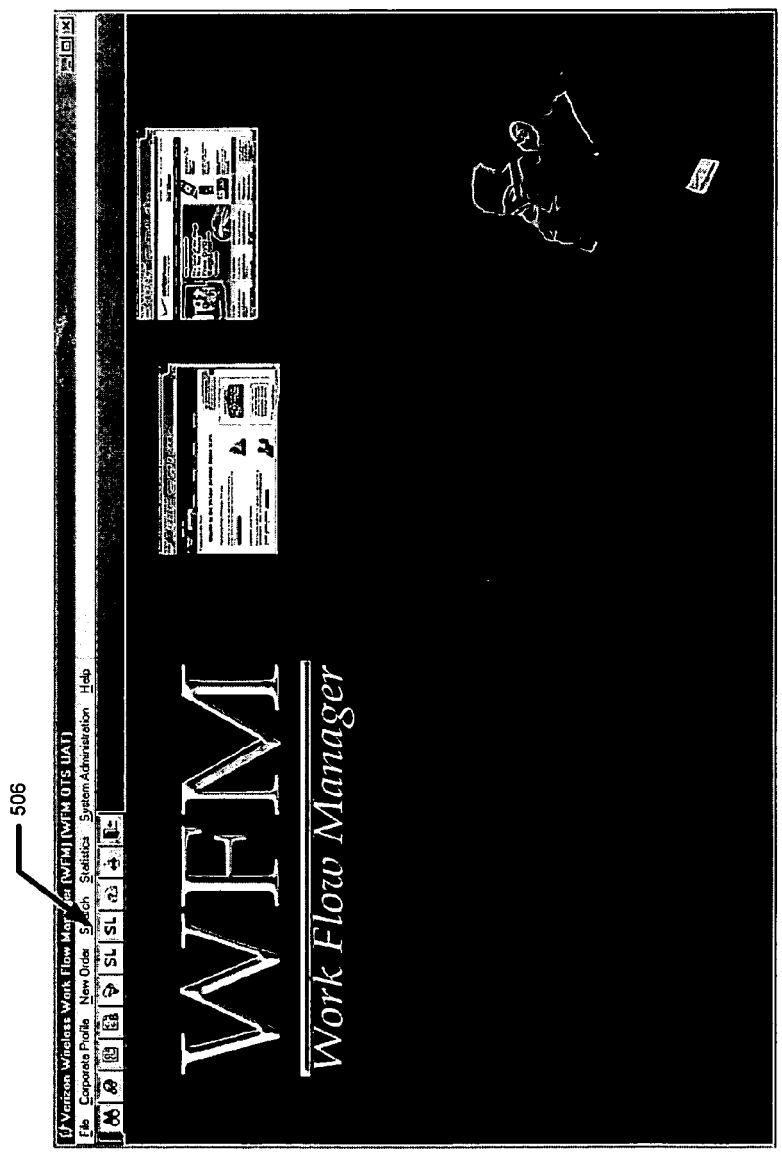
FIG. 5b is an exemplary screen that is displayed after access to a workflow manager application has been obtained in an embodiment according to the present invention.
Figure 5C:
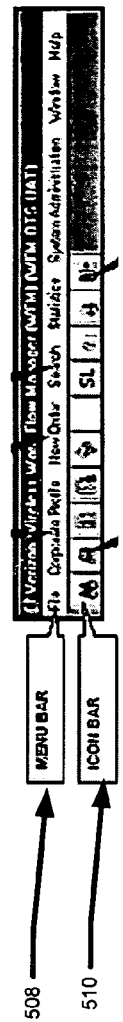
FIG. 5c is a view of an exemplary workflow manager toolbar of an embodiment according to the present invention.

The WFM is a browser-based application and may be launched from browsers such as Microsoft Internet Explorer, Netscape, Mozilla Firefox, etc. As, in one embodiment, it is generally encoded in Java, it is substantially platform independent. To launch the WFM, a user executes a http link such as, for example, http://etm-ecpd-pfix.odc.vzwcorp.com:8310/ordertracker/login, which causes a screen such as the one shown in FIG. 5a to be displayed on a computing device's display to the user, though it is to be appreciated that other means of launching the application are contemplated under the scope of this invention. The user will then enter a user name 502 and a password 504, to gain access to the WFM, as is known in the art. Once a user has gained access, a screen such as the exemplary one of FIG. 5b is displayed, which illustrates an embodiment of a WFM toolbar 506. A user also has the ability to change their password after gaining access to the WFM, as is also known in the art. A more detailed view of an embodiment of a toolbar 506 of FIG. 5b is shown in FIG. 5c. As shown in FIG. 5c, the toolbar is generally comprised of two bars, a menu bar 508 and an icon bar 510.

Once the application is launched and the user has gained access, the user may indicate to the system of the WFM whether that user is available to process work items. In one embodiment according to the invention, upon login a user is marked as available to work offline work such as, for example, emails. A user has the option to mark him/herself as unavailable as necessary during the day. While a user is in an unavailable status, the WFM will not assign any additional work items to the unavailable user. When ready, the user can mark him/herself as available again, and the WFM will assign work items to this user. A user may mark themselves as available or unavailable by move the cursor over the WFM icon in the system tray (generally the bottom right corner of the monitor) and use the right click button on a mouse to view the "I'm Not Available" option. The user then selects the "I'm Not Available" option and unavailable reason codes will be displayed for the user's selection. The unavailable reason codes may include lunch break, in a meeting, restroom break, on the phone, etc. The user selects the appropriate code (generally by clicking on it with their cursor) and the menu will close. In one embodiment the WFM icon in the system tray (bottom right corner of the monitor) will change colors indicating the user is in an unavailable status.

A user marks themselves as available by, for example, moving the cursor over the WFM icon in the system tray (bottom right corner of the monitor) and using the right click button on the mouse to view and select the "I'm Available" option. The menu will then close and the WFM icon in the system tray (bottom right corner of the monitor) will change colors to indicate the user is in an available status.

Upon logging out of the WFM a user is notified whether the user currently has any work items in an OPEN status by the display of an open orders box. If the user does not have any OPEN status work items, the open orders box is not displayed. The user may select and release any of the OPEN status work items back to an AUTOASSGN status, whereby the released work items will be reassigned to the next available user. The user may also keep the OPEN status work items assigned to him/herself by not selection any of the OPEN status work items, and the work items not selected will remain in an OPEN status for the user to work when he/she next logs into WFM.

System Administration

As described herein, the WFM may interact with varying hierarchical levels within an organization such as, for example, centers, teams and customer service representatives. Administrative functions within the WFM provide for establishing these hierarchical levels and users associated with each level. For instance, at the center level new centers may be added, existing centers may be modified, a center's operating hours may be established, modified and deleted, exception days for a center may be established, modified, and deleted, email addresses associated with a center may be added, modified (including activation and deactivation) and deleted.

Figure 6:
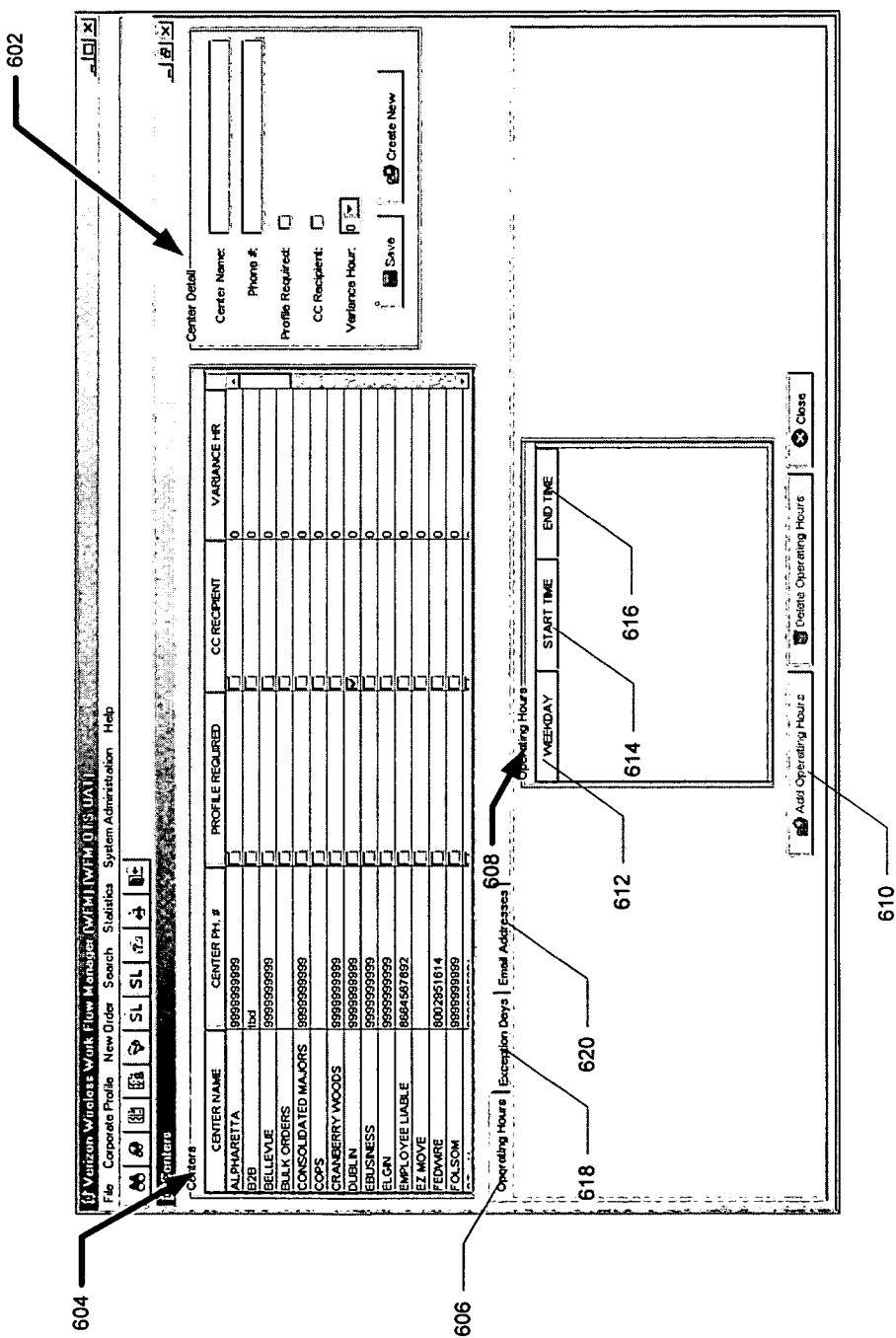
FIG. 6 is an embodiment of an exemplary screen that may be used to perform administrative functions for a center of a business organization.

FIG. 6 is an embodiment of an exemplary screen that may be used to perform administrative functions for a center. The screen of FIG. 6 may be displayed to a user such as, for example, an administrator, by selecting from the WFM menu bar, System Administration->Security->Centers. From this screen, a new center may be added to the WFM by completing the details for the new center in the Center Detail section of the screen 602. In this section, exemplary information may include a center name and phone number, an indication whether the new center requires a corporate profile to be associated with a work item before the work item can be closed (by checking the profile required checkbox); whether the center wants to have any WFM auto-acknowledgements of received work items sent to the CC'd recipient email addresses (from an original customer email request) (by checking the CC recipient checkbox), and if the center is in a time zone other than Eastern Standard, a variance hour is set. (Example: If the center being set up is located in Central time zone, the Variance Hour will be set to "−1" to indicate that it is one hour behind Eastern Standard Time.) Clicking or selecting the Create New button then adds the new center to the WFM. Additional information about the new center may include adding operating hours, an exception day, and email addresses, as each are described below.

An existing center may also be modified by selecting a center to be modified from the Centers section 604 of the screen. The selected center's settings will then be displayed in the Center Detail section 602 of the screen and can be modified and saved.

To establish a center's operating hours, the Operating Hours tab 606 is selected and in the Centers section 604 of the screen, the center to be set up or modified is selected. The center's current operating hours (if any exist yet) will then be displayed in the Operating Hours table 608 in this screen. By selecting the Add Operating Hours button 610, operating weekdays 612, start time 614, and stop time 616 can be added. If a weekday already exists in the Operating Hours table 608, the weekday is selected, which allows modification of the operating hours or deletion of the weekday.

Center exception days (e.g., holidays) may also be added, deleted or modified by selecting the exception days tab 618 and following a similar procedure as described above in relation to center operating hours.

Email addresses may also be established with a center. The email addresses that may be added in the exemplary screen of FIG. 6 are the email addresses that will be available for selection by users as the "From" address when creating correspondence to a customer. (Example: the email addresses for the monitored email boxes to which the customer sends the original email request.) By selecting the email addresses tab 620, email addresses may be added, deleted, activated and inactivated.

Figure 7:
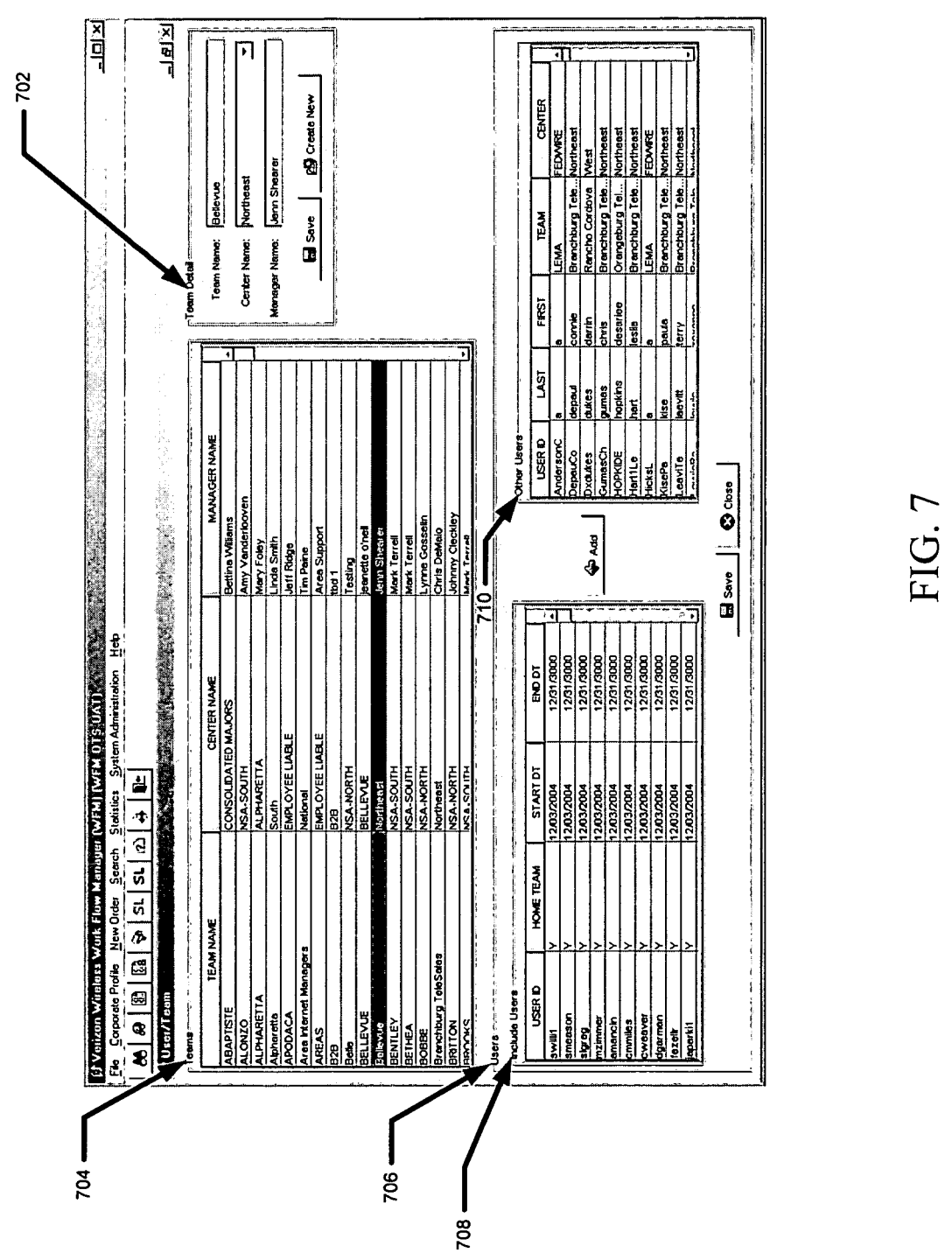

FIG. 7 is an embodiment of an exemplary screen that may be used to perform administrative functions for a team. A team, in this exemplary embodiment, is hierarchically related to a center in that a center is comprised of one or more teams. The screen of FIG. 7 may be displayed to a user such as an administrator by selecting from the WFM menu bar, System Administration->Security->Team Administration. A new team may be added by entering, for example, information about a team including the Team Name, selecting the Center Name (thus establishing the hierarchical relationship between the team and the center), and entering the Manager Name for the new team in the Team Detail section 702 of the screen.

An existing team may also be modified by selecting a team in the Teams section C04 of the screen, and the selected team's settings will then be displayed in the Team Detail section 702 of the screen and may be modified.

Just as a center is comprised of teams, teams are comprised of users. The users that comprise a team are shown in the Users section 706 section of the screen. A user to team association allows a user to support one or more teams. A user can only belong to one home team, but he/she can be set up—through a user to team association—to support other teams in addition to (or instead of) his/her home team. In one exemplary embodiment, any emails belonging to the team(s) to which a user is associated are eligible to be routed to that user, but if a user's home team association is active, the emails belonging to his/her home team will take precedence over emails belonging to his/her non-home team(s)—for routing purposes only. In other words, the user will always receive new email for his/her home team first, and when none exists then the user will receive new email from the other team(s). If the user's home team association is inactive, this precedence does not apply, as the user will not be receiving new email from his/her home team. To add a new user to a team, in the Teams section 704 of the screen, select the team to be modified. The team's current users will then be displayed in the Include Users table 708 in the Users section 706 of the screen. To add a user to a team, select the desired User Id in the Other Users table 710 in the Users section 706 and click the Add button. Home Team (usually assigned to that team) vs. non-Home Team users (temporarily or non-permanently assigned to that team) can be identified in this screen by the Y or N, respectively, in the Home Team column in the Include Users table 708 in the Users section 706 of the screen. Likewise, user information may be modified by selecting a User ID from the list of users in the Include Users table 708 of the Users section 706 of the screen.

Other information that may be established for the WFM code are status code, reason codes, codes and the association between status and reason codes. Reason codes are standard codes that help explain the status of a item in the WFM, reasons for a user being unavailable (e.g., on the phone, lunch, etc.), and logoff reasons (e.g., end of shift, sick, etc.). Status codes are assigned to work items either manually or automatically as they enter the WFM (e.g., open, cancelled, pending, new, completed, etc.) and status codes are associated with one or more reason codes so that when a work item is assigned a status a reason can be provided for that status. These codes (status and reason) may be added, deleted, and modified to provide flexibility to the WFM system for handling various work items.

One exemplary work item that may be process using the WFM is an order such as, for example, an order for service and telecommunications device (e.g., wireless phone) for a telecommunications provider. Orders may be assigned either automatically or manually an order type. Order types may include, for example, EON for an equipment order, DISC for a discount, DEAC for service deactivation, etc. Order types may be used for reporting purposes and help provide for consistent processing of work items. Order types may be established, modified, activated and deactivated in the administrative screens of the WFM. Each order type is associated with one or more status codes so that certain status codes are available for a work item when assigned a certain order type. If an association is not made for a certain order type/status code combination then that status code will not be available for that order type. The administrative screens of the WFM allow order types and status codes to be associated and the association maintained or deleted.

Order types may also be associated with centers, which determines what order type(s) will be available for selection by the user for his/her center when working a work item. If an association is not made for a certain order type/center combination then that order type will not be available for that center's users. A center to order type association also identifies a center's queues into which its emails are routed. If an association is not made for a certain order type/center combination then emails for that center will not be routed to that order type. The administrative screens of the WFM allow the establishment and maintenance of the order type/center combinations. Service level hours and service level commitments are also established for each order type associated with a center. The service level hours is the amount of time (in hours) that a work item should be processed after it is received into the WFM, and the service level commitment is the commit time that the work item should be completed within after the work item is received into the WFM.

Likewise, the administrative screens of the WFM allow the establishment, modification and deletion of a user to order type association, which determines what order type(s) will be available to that user for selection by the user when working a work item. If an association is not made for a certain order type/user combination that order type will not be available for that user to select. A user to order type association also determines what work item order type(s) a user can be assigned by the WFM. If an association is not made for a certain order type/user combination then that user will not be systematically assigned emails for that order type.

Work items may be automatically or manually assigned a correspondence code. A correspondence code indicates whether, for example, whether an originator or someone associated with a work item is to receive correspondence at junctures of the processing of the work item (e.g., upon receipt, when complete, etc.) The WFM exemplary administrative screen of FIG. 8 provides for establishing, modifying, deleting and associating correspondence codes.

Correspondence types are associated with centers, order types, and correspondence templates. This association determines what correspondence type(s) are available for selection in a Message Template field in a Compose Email screen by a user for each order type within a center as well as the template text that will be displayed for this center/order type/correspondence type combination. If an association is not made for a certain center that correspondence type will not be available for a user in that center to select, but if an association is made for a certain center but not for a certain order type within that center the correspondence type/template will still generally be available to the user via, for example, a Get All Templates button on the Compose Email screen.

Figure 8A:
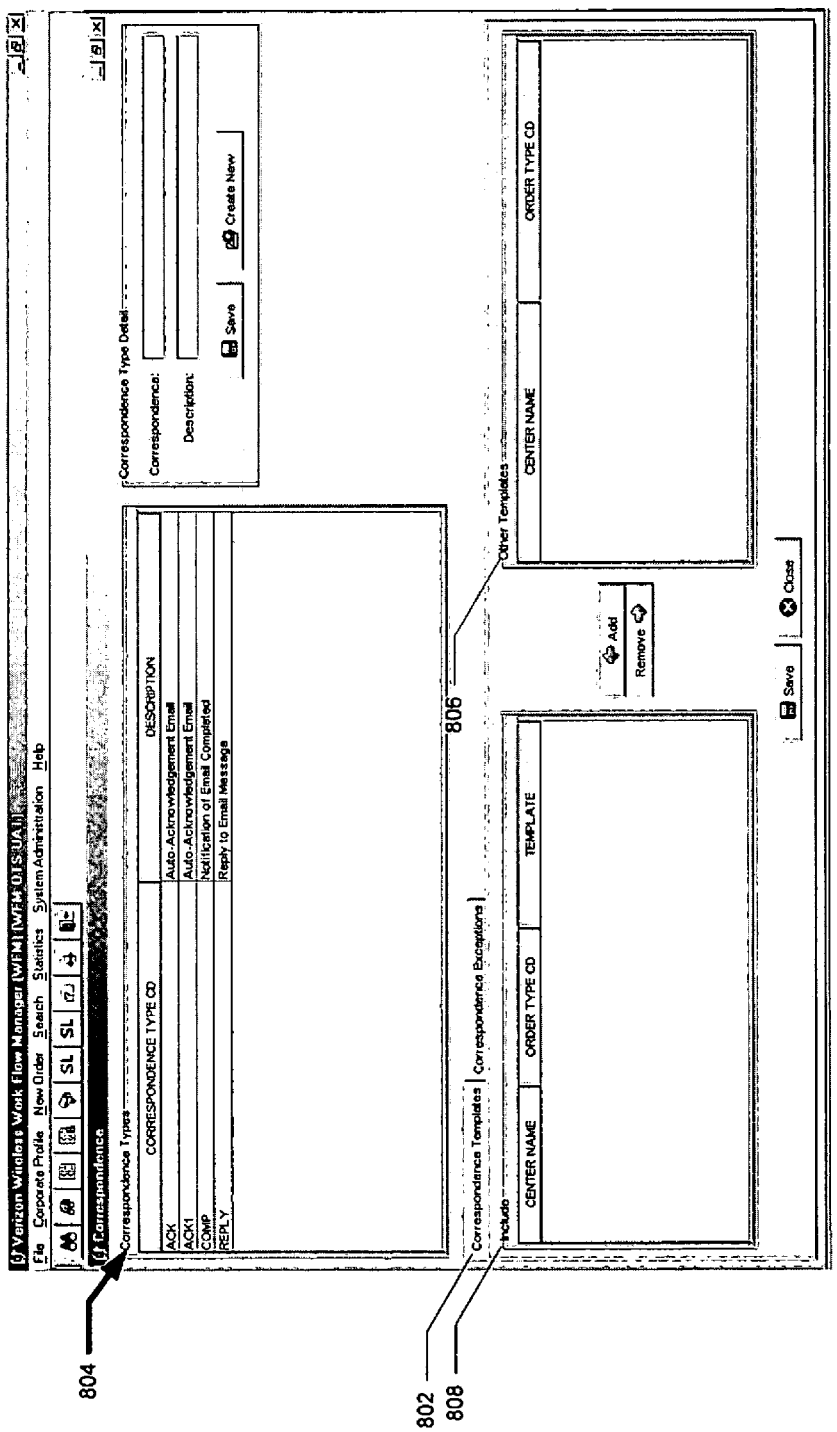
FIG. 8a is an exemplary screen that may be used to associate correspondence types with templates in an embodiment according to the present invention.
Figure 8B:
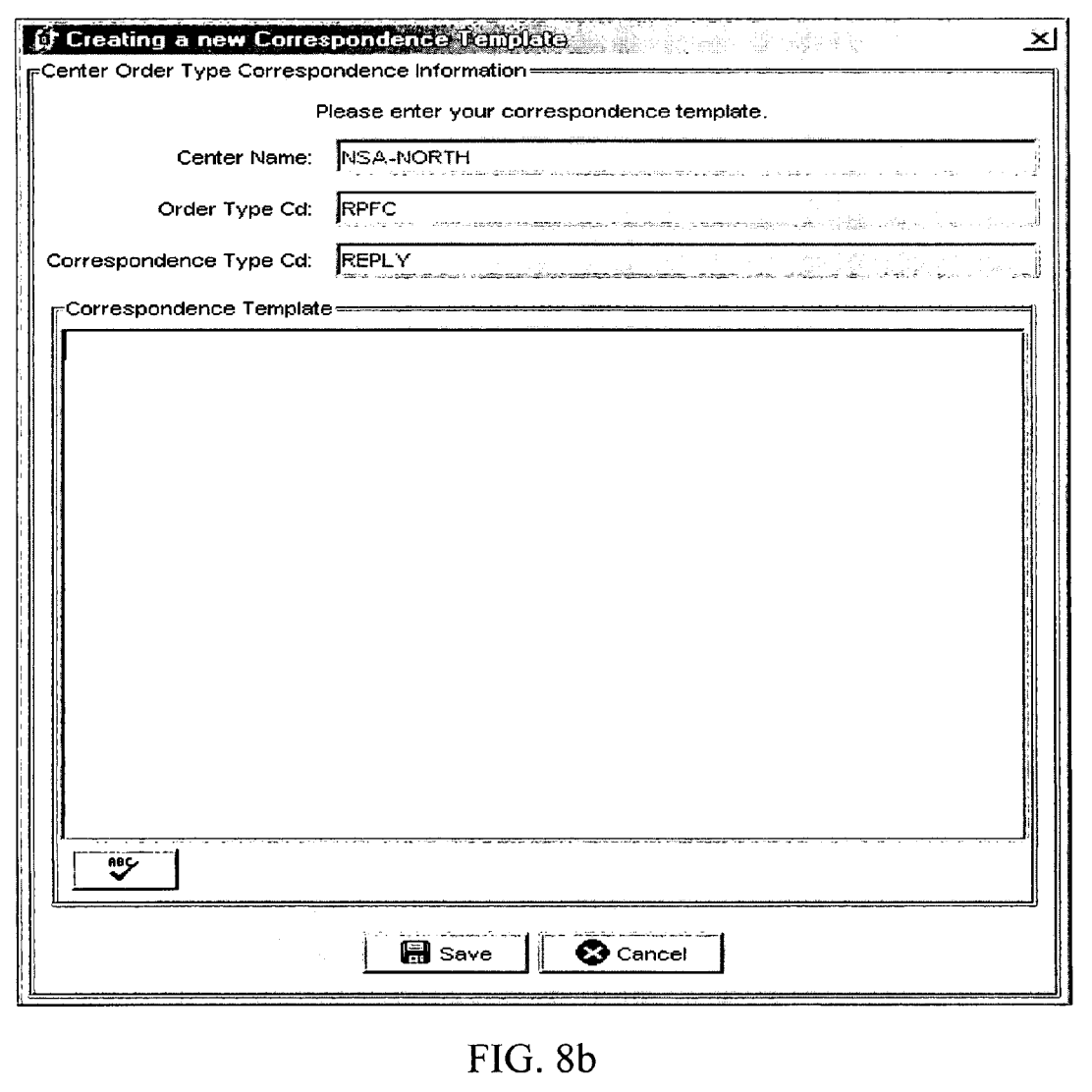

In FIG. 8*a*, to associate correspondence types with templates, select the correspondence templates tab 802 in the bottom half of the correspondence screen of FIG. 8*a*, and in the correspondence types section 804 of the screen, select the correspondence type to be set up or modified. The correspondence type's current centers/order types/templates (if any exist yet) will then be displayed in the Include table in this screen. To add a center/order type to a correspondence type, select the desired center name/order type code combination in the other templates table 806 in the correspondence templates tab 802 and click the Add button, which causes a new correspondence template box to be displayed. The user then enters the correspondence template text for this center/order type/correspondence type combination as shown in FIG. 8*b*. After saving, the center/order type will be moved from the other templates table 806 to the include table 808 for the selected correspondence type. This can be repeated until all desired center/order type/templates have been moved to/created in the include table 808 for this correspondence type. Likewise, the association between a center/order type/template and a correspondence type may be modified or deleted.

Furthermore, a correspondence exception to correspondence type may be established using the administrative functions of the WFM. A correspondence exception to correspondence type association determines what correspondence type(s) are not systematically sent to the internet domain(s) and/or email address(es) listed with a work item or the originator of a work item. This is accomplished by associating an exceptions list of email addresses and/or Internet domains with a correspondence type such that no correspondence is automatically sent to this addresses or domains in the exceptions list. In one embodiment, the email addresses and/or domains in the exceptions list may be activated (no correspondence) or inactivated (correspondence is sent).

Figure 9A:
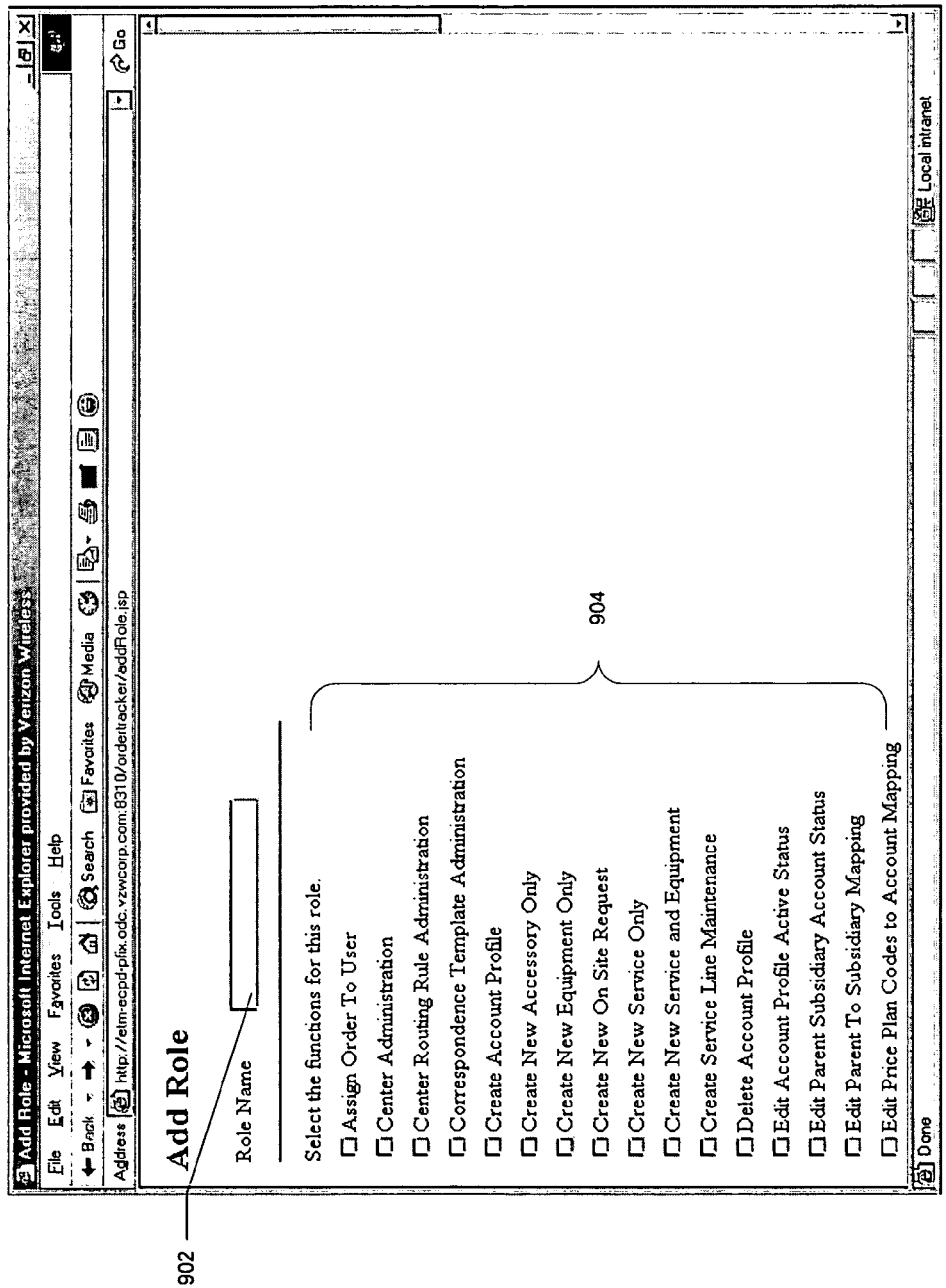
FIGS. 9a and 9b are exemplary screens that illustrate functions that may be assigned to a role in an embodiment according to the present invention.
Figure 9B:
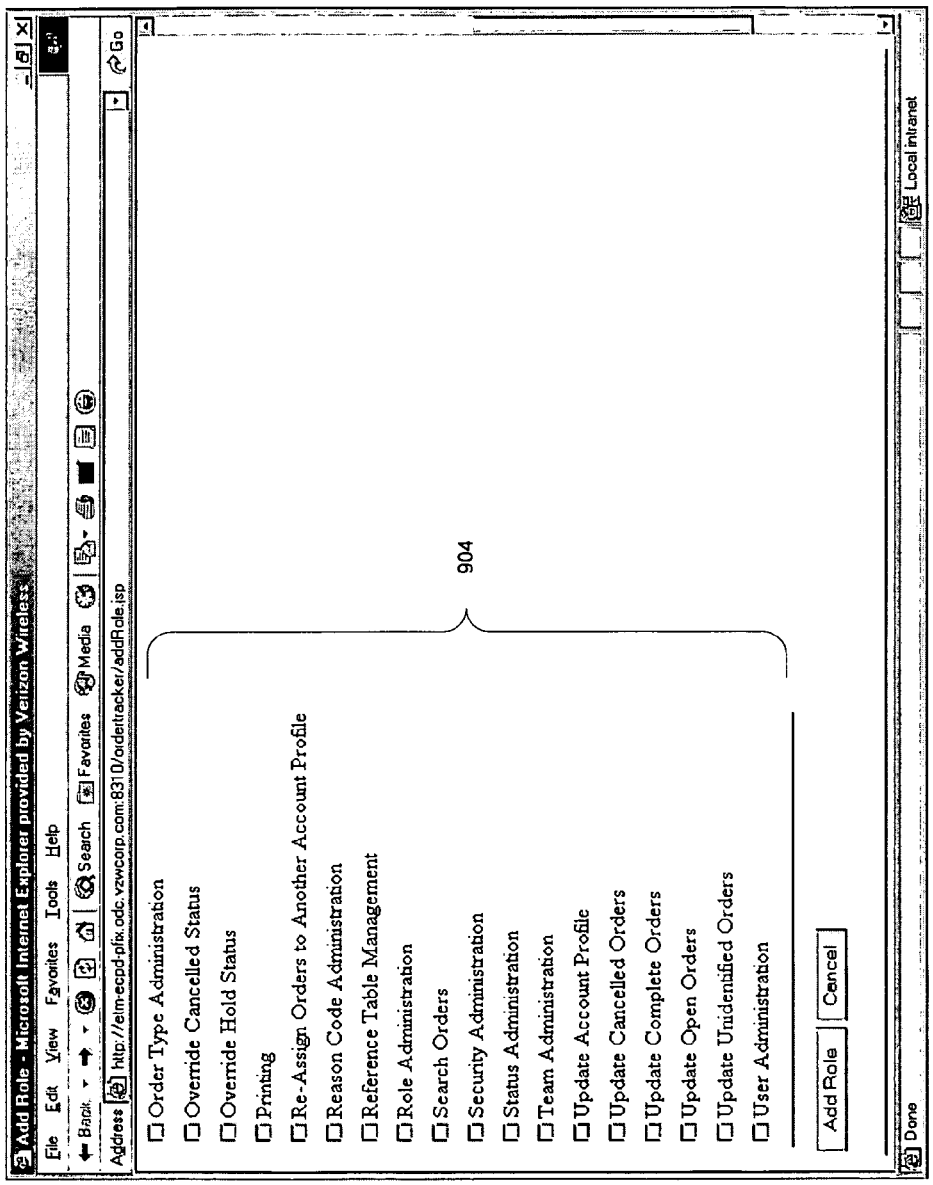

Another aspect of the WFM that may be established, modified or deleted in the administrative functions is the creation of roles with various levels of authorization. Roles may be. For example, an administrator, an area representative, a developer, a manager, an account manager, operations personnel, a reporting analyst, etc. Exemplary functions that may be assigned to a role in an embodiment of the invention are shown in FIG. 9*a* and FIG. 9*b*. Upon entering a role name 902, various functions 904 may be assigned to the role by checking the box next to the functions 904. Likewise, functions may be deleted from roles (by, for example, un-checking the box) such that the functions 904 of a role are modified.

Yet another aspect of the WFM is the ability to add users and assign a user a team and a role. Referring to the exemplary administrative screen of FIG. 10, user information including the user's assigned team 1002, role 1004 and whether the user is an active user 1006 is entered into the WFM. Likewise, existing users may have their information modified and/or a user may be removed from the system.

Figure 11A:
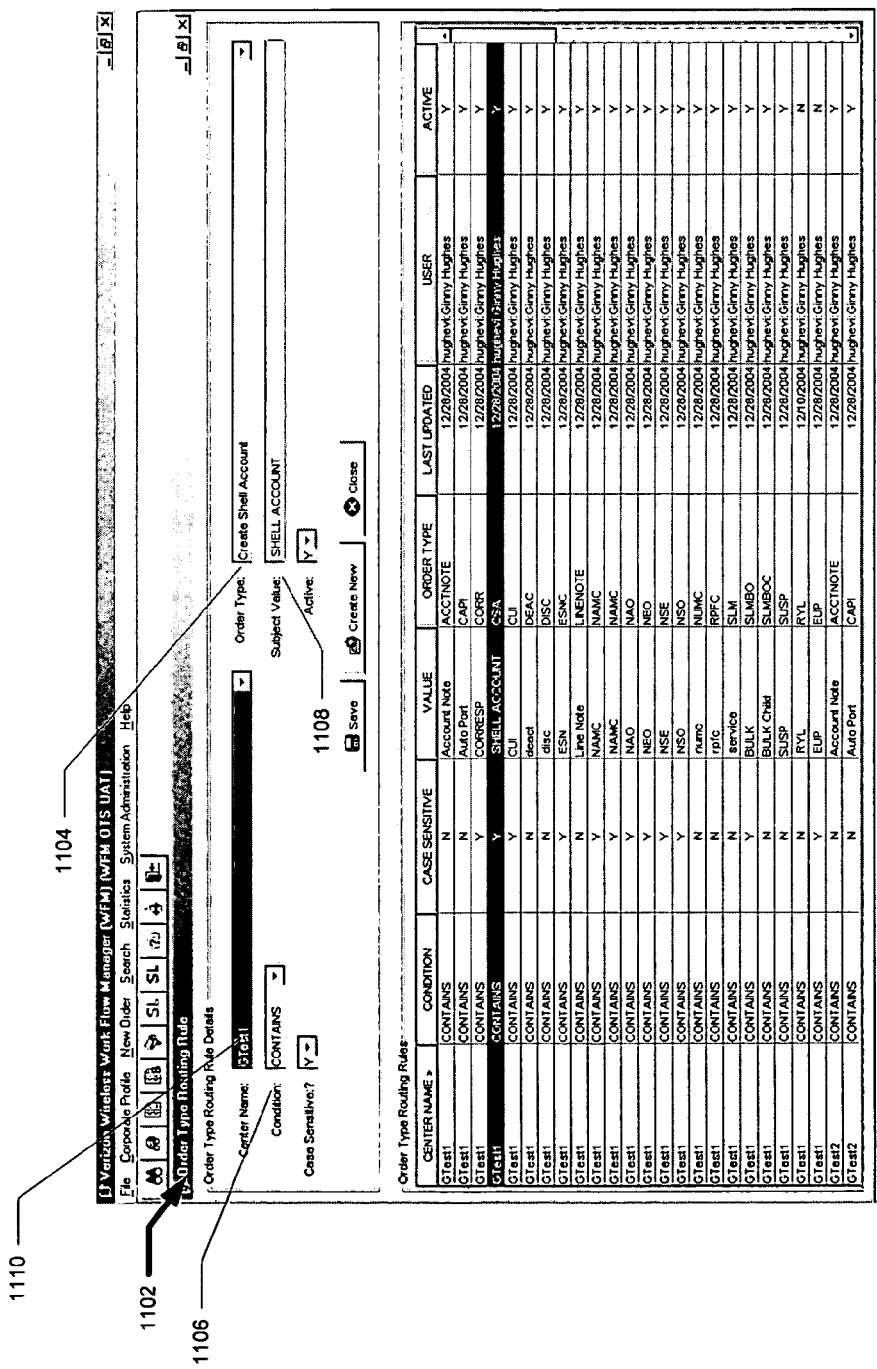
FIG. 11a is an exemplary screen that allows the creation of a new order type routing rule in an embodiment according to the present invention.
Figure 11B:
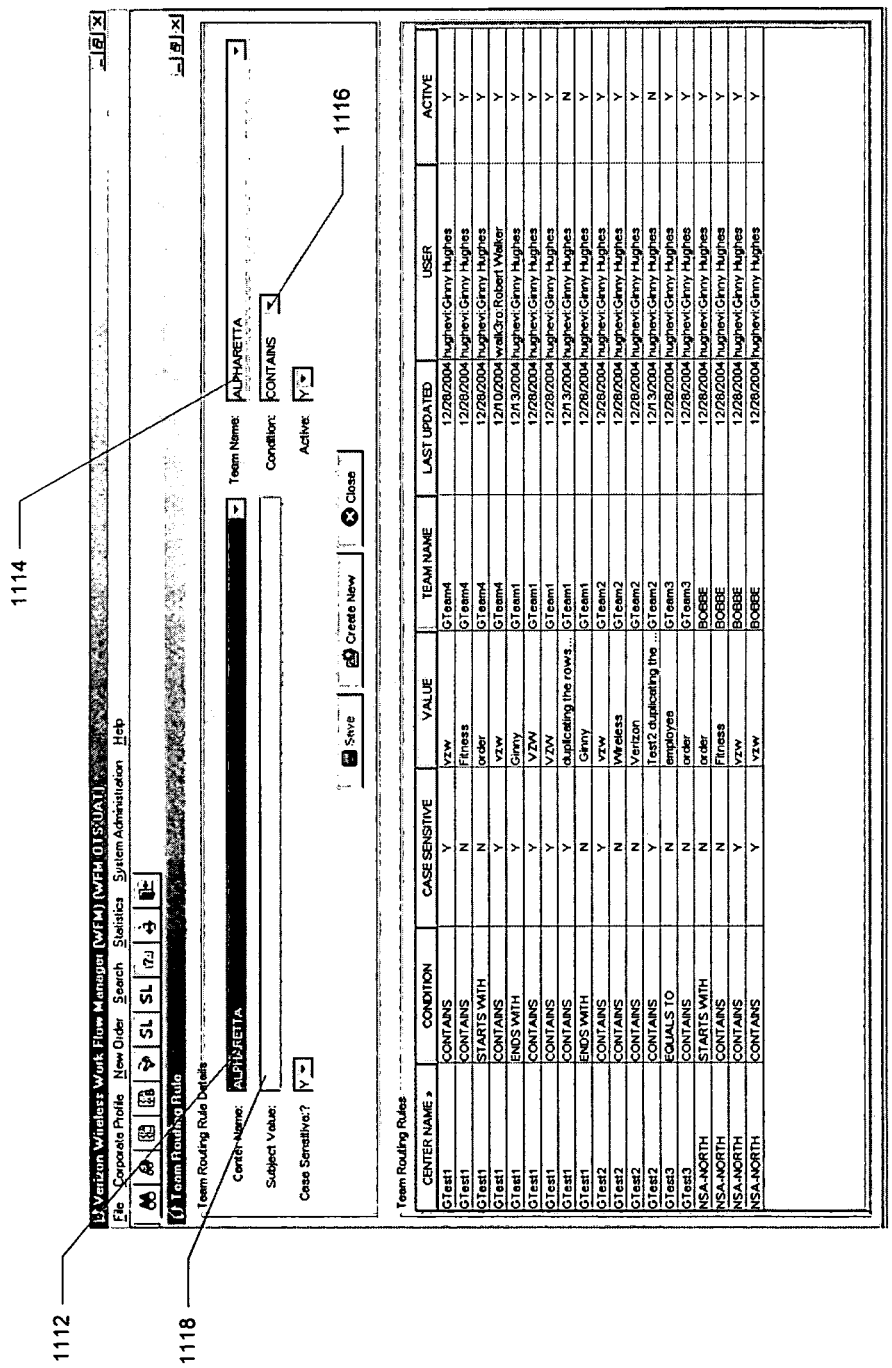
FIG. 11b is an exemplary administrative screen that provides for routing work items of a certain center to a designated team if the work item meets a certain condition as defined by the subject value, in an embodiment according to the present invention.

The WFM administrative screen also allows for the creation, maintenance and deletion of work item routing rules. For instance, the exemplary screen of FIG. 11*a* allows the creation of a new order type routing rule 1102 where a work item having a certain order type 1104 and having a certain condition (e.g., contains, begins with, matches, etc.) 1106 as such condition is defined by a subject value 1108, which is found in the subject or body of an email, is assigned to a designated order type. Similarly, FIG. 11*b* is an exemplary administrative screen that provides for routing work items of a certain center 1112 to a designated team 1114 if the work item meets a certain condition 1116 as defined by the subject value 1118. Routing rules can also be established to auto-delete work items containing inappropriate material such as, for example, spam, pornography, vulgarity, unsolicited advertising, etc. Also, work items may be routed to centers and/or teams based on the email address or domain that originated the work item.

Email Workflow

As previously described, work items may be comprised of emails, orders and other items for processing or action. The following paragraphs describe the work flow for emails.

FIG. 3 is an exemplary embodiment of a screen that is displayed by a graphical user interface in a display device for processing a work item comprised of an email is shown in FIG. 3 and has "tabs" for the message body 302, attachments 304, outgoing emails 306, related emails 308, tracking history 310, orders 312, and notes 314. The screen also has an "assignment" section 316 that provides information about whether the work item has been assigned to someone for further processing and, if so, information about to whom it has been assigned and status information about the work item.

If a user of the WFM is in an available status and does not have any WFM emails in an OPEN status, then the system may auto-assign a new email to a user. When a new email is assigned to a user, the user will receive some sort of a visual notification. In one embodiment of an option for the WFM, the user may select an Enable Audio Alert option that allows a user hear an alert message (in addition to the notification box described above) when a new email is auto-assigned to him/her by WFM if the user's computing device is audio capable. This option may also be disabled.

A user also has the option of searching emails based on various criteria. For example, a user may search for all emails that are assigned to the user (based on the user's identifier used to log into the WFM); emails that have been reassigned (and have a status of "reassigned"—described in greater detail herein); unidentified emails (emails having a status of "unidentified"); emails in the user's center where each email's service level is in jeopardy of not being met; emails where the service level has been missed; and, a general search based on criteria that includes Email Id—WFM-assigned email reference number, Order Id—Order Id/Reference number of the order(s) associated with the emails, Source—Origin of the email (EMAIL, FAX, All, etc.), Assignee—User Id: User Name of the user to whom the emails are currently assigned, Center—Center to which the emails are currently assigned, Team—Team to which the emails are currently assigned, Status—Status code currently associated with the emails, and Reason—Reason code currently associated with the emails' status, if applicable (not all statuses have reason code(s)). Any one or all of the above searches may be conducted via hotkeys on the WFM toolbar. The search may be further focused based on email or orders received between certain dates or those completed between certain dates.

Email details are generally available from the email detail screen of which an embodiment is shown as FIG. 3. A header section 318 of this screen may include such information as: Email Id—a WFM-assigned email reference number; Subject—Subject line text from the email; From—From address of the email; Reply—Address that will be used in an email reply to the customer; To—Address to which the email was sent (WFM-monitored email box); Cc—Any addresses that were CC'd on the email; Received—Date the email was received into the WFM-monitored email box (the time is shown in EST); etc. The Assignment Information 316 may include the following fields for the email: Assignee—User Id: User Name of the user to whom the email is currently assigned; Center—Center to which the email is currently assigned; Team—Team to which the email is currently assigned; Request Type—Order Type currently associated with the email; Status—Status code currently associated with the email; Status Reason—Reason code currently associated with the email's status, if applicable (not all statuses have reason code(s)); etc.

The tabs on the screen embodiment of FIG. 3 includes a Message Text tab 302, which displays the body text of the customer's email; an Attachments tab 304, which contains all attachments sent in the customer's email. The user can double-click on any listed attachment(s) to open; an Outgoing Emails tab 306 allows a user to display a list of all system-generated and user-generated sent (outgoing) emails that are tied to this email id; the Related Emails tab 308 displays a list of all received (incoming) emails that are tied to this email id; the Tracking History tab 310 displays a history of the changes made to fields in an email including, for example, the assignee, the center, team, request type (a.k.a. order type), and status; the Orders tab 312 displays a list of the orders that have been created for this email; and, the Notes tab 314 is used to add notes/comments to an email.

As previously indicated, emails may be automatically or manually assigned. The Assignment Information section 318 of the Email Details screen displays assignee's name and the status of an email. As indicated above, the status is "open" for a newly assigned email. A user may reassign an email if necessary. Reasons for reassignment may include that the currently assigned user cannot work this work item due to lack of knowledge, experience, etc. To reassign, the user changes the email's Status to REASSIGN and sets the Assignee field to blank. The email will be removed from the user's inbox and will be reassigned to another user by an authorized user.

Emails in a REASSIGN status may only be worked by an authorized user. An authorized user is responsible for monitoring and assigning these emails. An authorized user has two options for reassigning the email: auto assign and assignment to a specific user. To have WFM reassign the email to the next available user, an authorized user sets the Status of the email (work item) to AUTOASSGN. The email (work item) will be automatically routed to the next available user working this center/team/order type in FIFO (first in, first out) order, but the email (work item) will not be routed to the user who originally placed the email in REASSIGN status. To reassign the email to a specific user, the authorized user sets the Status to OPEN and sets the Assignee to the specific user's user id and user name. The email is routed to the specified user in an OPEN status regardless of whether the user currently has any other WFM emails in an OPEN status.

Once an email has been automatically or manually assigned to a user, the Status becomes OPEN. A user has the ability to change an email's Status based on the working stage of the email (e.g., WAITING, COMPLETED, etc.) If one or more status reasons exist for the selected Status a Status Reason code selection may be required. If necessary, set the Status Reason to the correct value.

When a user has completed work on an email (or order), the user may notify the customer, originator of the email, or other designee of the completion of the work by sending a Notification of Email (Order) Completion. If the user has not sent Notification of Email (Order) Completion the user will receive a reminder to send this email when trying to save an email having a status as COMPLETED. The user is not required to send the Notification of Email Completion even when the reminder message is displayed and the email status may be saved as COMPLETED without sending a completion email.

Similar to unidentified orders and other unidentified work items, an email is set to an UNIDENTIFIED center and team when the WFM cannot determine the team and possibly the Request Type (a.k.a. Order Type) for the email. Emails in an UNIDENTIFIED center and team can only be worked by an authorized user. An authorized user is responsible for monitoring and assigning these emails. The authorized user selects the correct Team in the dropdown in the Assignment Information section of the Email Details screen and, if necessary, selects the correct Request Type in the dropdown in the Assignment Information section of the Email Details screen (FIG. 3). The authorized user may then change the center and team to reflect the proper assignment, to auto assign or to assign the email (work item) to a specific user. To have WFM reassign the email to the next available user, the authorized user sets the Status to AUTOASSGN. The email will be automatically routed to the next available user working this center/team/order type in FIFO (first in, first out) order. To reassign the email to a specific user, the authorized user sets the Status to OPEN and sets the Assignee to the specific user's user id and user name. The email will be routed to the specified user in an OPEN status regardless of whether he/she currently has any other WFM emails in an OPEN status.

Order Workflow

Figure 12:
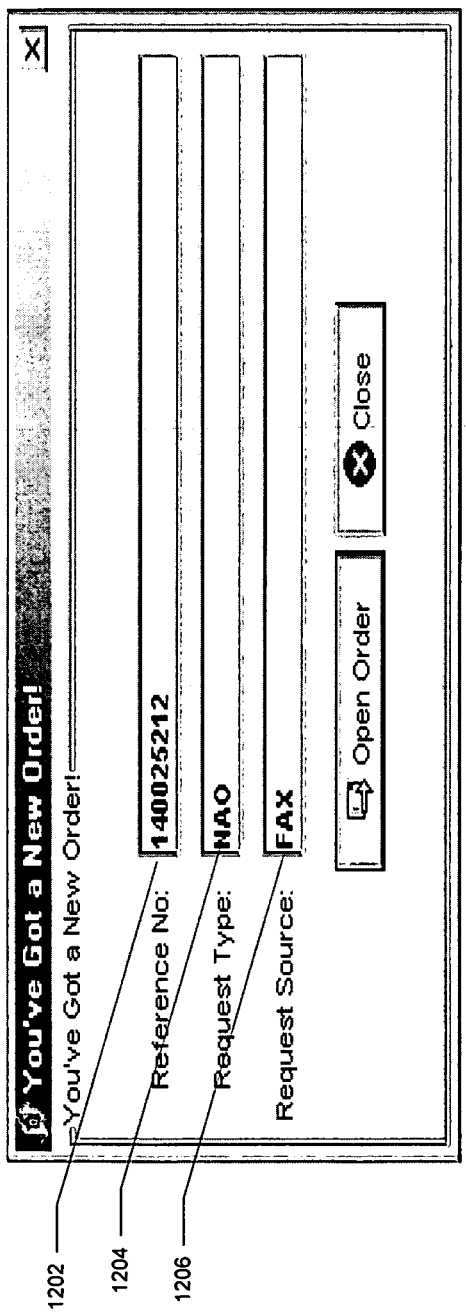
FIG. 12 is an exemplary image that may be displayed by the GUI to the user to alert them to the receipt of an order in an embodiment according to the present invention.

As previously described, work items may be comprised of emails, orders and other items for processing or action. The following paragraphs describe the work flow for orders, which are requests for services and/or devices from consumers. For example, a consumer desiring wireless communications services may place an order for a services contract along with a mobile communications device (e.g., cell phone) through www.verizonwireless.com that creates an order that flows into the WFM Referring back to FIG. 4, when the WFM 400 receives an order that requires attention from a center, team or CSR, the GUI 404 provides the user with a notice or alert by, for example, displaying a message on a user's computing device via a pop-up dialog box, or by other means such as a sound, flash, vibration, etc. In one embodiment the exemplary image shown in FIG. 12 is displayed by the GUI to the user to alert them to the receipt of an order. The exemplary image in FIG. 12 provides some basic information about the order including a reference number 1202, a request type 1204 (which may be dependant upon the business organization employing the WFM), and the source 1206 of the order (in this case, a facsimile transmission.) Once alerted, the user (for example, a CSR) can then proceed with opening the received order through the GUI and the application server, or close the order for later action because they are currently working on something else. If closed, the order remains assigned to the CSR for action.

Figure 13:
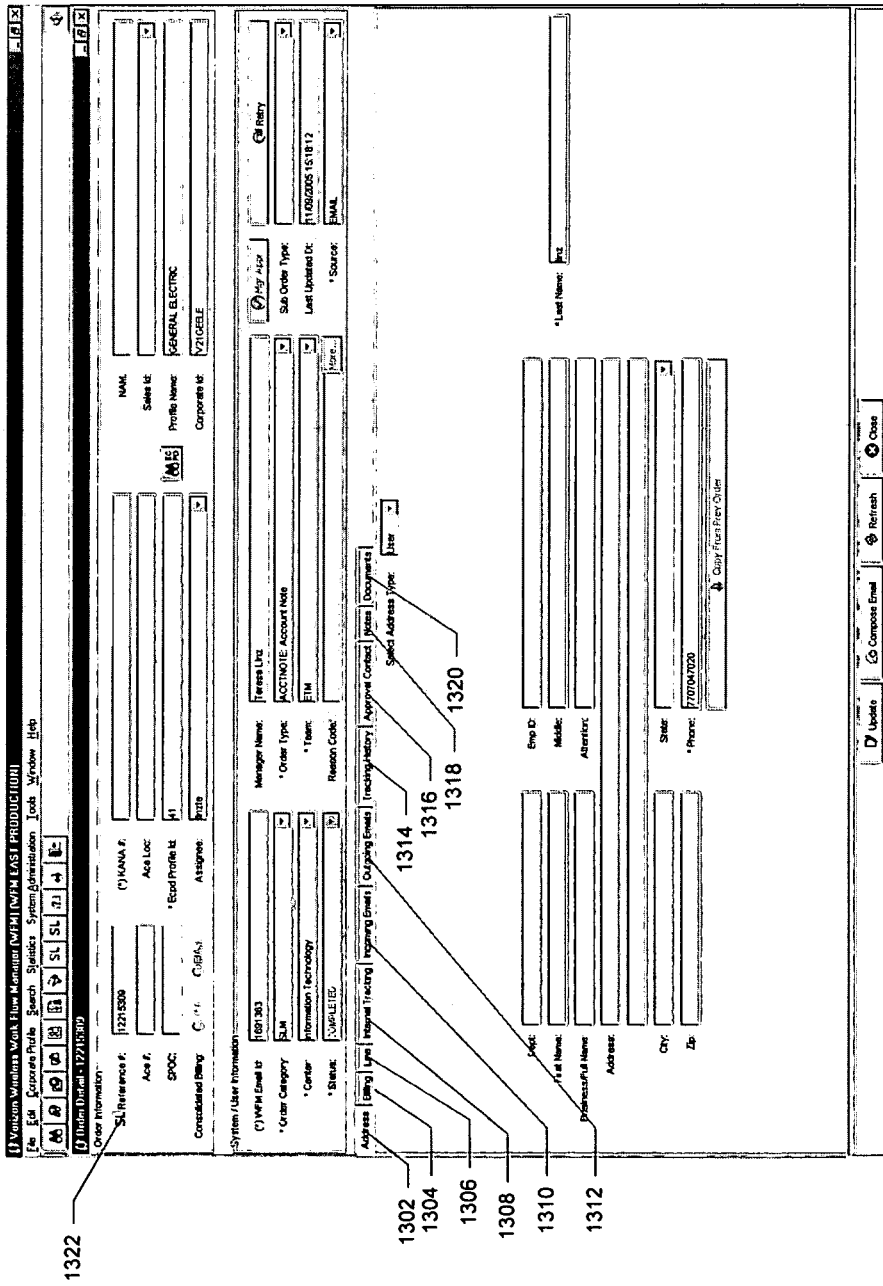
FIG. 13 is an exemplary screen of order information that may be displayed by the GUI to the user in an embodiment according to the present invention.

If the user opens the order, then an exemplary screen of order information may be displayed by the GUI to the user such as the one shown in FIG. 13. Details about the order are available for display and may include, for example: address information of the ordering party, which may include a user's address, billing address, shipping address, etc. 1302; billing information, which includes information about how the customer is billed or is to be billed 1304; line information 1306, which is information relative to each mobile telephone number on the account if, for example, the WFM were used by a mobile communications service provider; internal tracking information 1308 for tracking the order internal to the business organization; incoming emails 1310, which are emails that have entered the WFM and that are related to the order; outgoing emails 1312, which are emails that have been sent by the business organization from the WFM as a result of this order; a tracking history 1314, where changes to the center, team, or assigned CSR are logged; approval contact information 1316, for example if the order required manager approval; notes 1318, which may include, for example, any information that the customer service representative may want to associate with the order; and documents 1320, which may include any attachments that were sent with the order containing further detail about the order. Furthermore, in an embodiment according to the invention an order is assigned a service level commitment upon receipt by the WFM (discussed in further detail herein). If the order has missed its service level, or is in jeopardy of missing its service level the customer service representative can easily see this by, for example, a service level icon 1322 or color coding or some other means of identifying the risk level of the order. In FIG. 13, the service level is indicated by an icon 1322 that changes color depending upon the risk associated with missing a service level commitment for the order being viewed.

Another type order that may be processed in an embodiment according to the invention is a tracking order. Tracking orders are orders that are created in the WFM to track and report on requests. Referring again to FIG. 3, a tracking order may be created in the WFM by selecting the Create Order button in the Assignment Information section 316 of the email details screen of FIG. 3. The WFM Email ID for the tracking order will automatically be populated in the tracking order because the new order screen is being accessed via the email that originated the request. The user selects an order type for the tracking order. Once created, the tracking order will be visible in the orders tab 312 in the email details screen of FIG. 3. Although order types may be customized to the business organization employing the WFM, in one embodiment where the WFM is used by a telecommunications services provider, the order types for tracking orders may include, for example, New Service and Equipment (NSE), New Service Only (NSO), New Equipment Only (NEO), New Accessory Only (NAO), New On Site Request (NOSR), Service Line Maintenance (SLM), and Service Line Maintenance Bulk Order (SLMBO)—Service Line Maintenance Bulk Orders also known as bulk order parent header records are used to track a group of Service Line Maintenance orders also known as child SLM records.

Searching Functionality

Figure 14A:
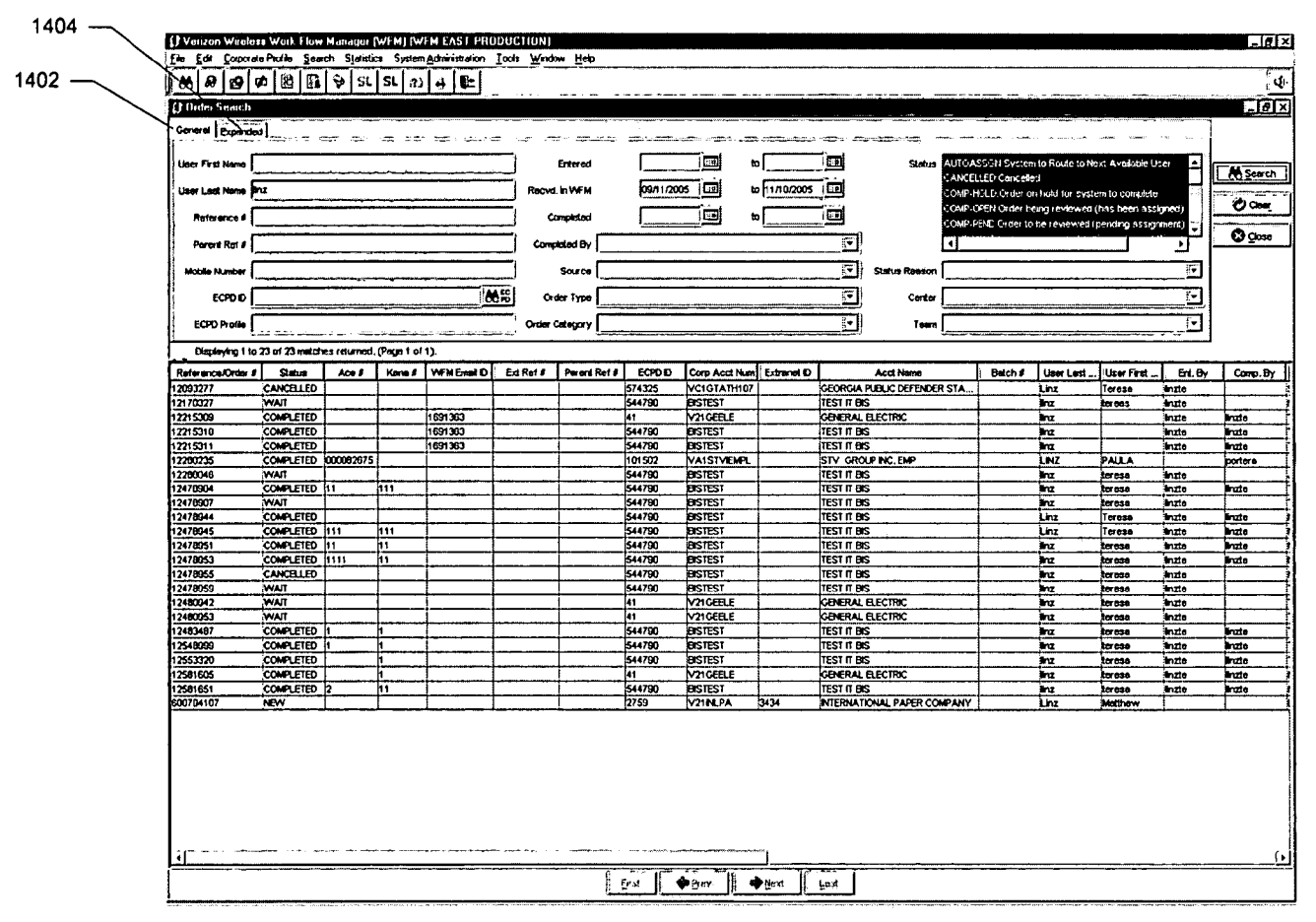
Figure 14B:
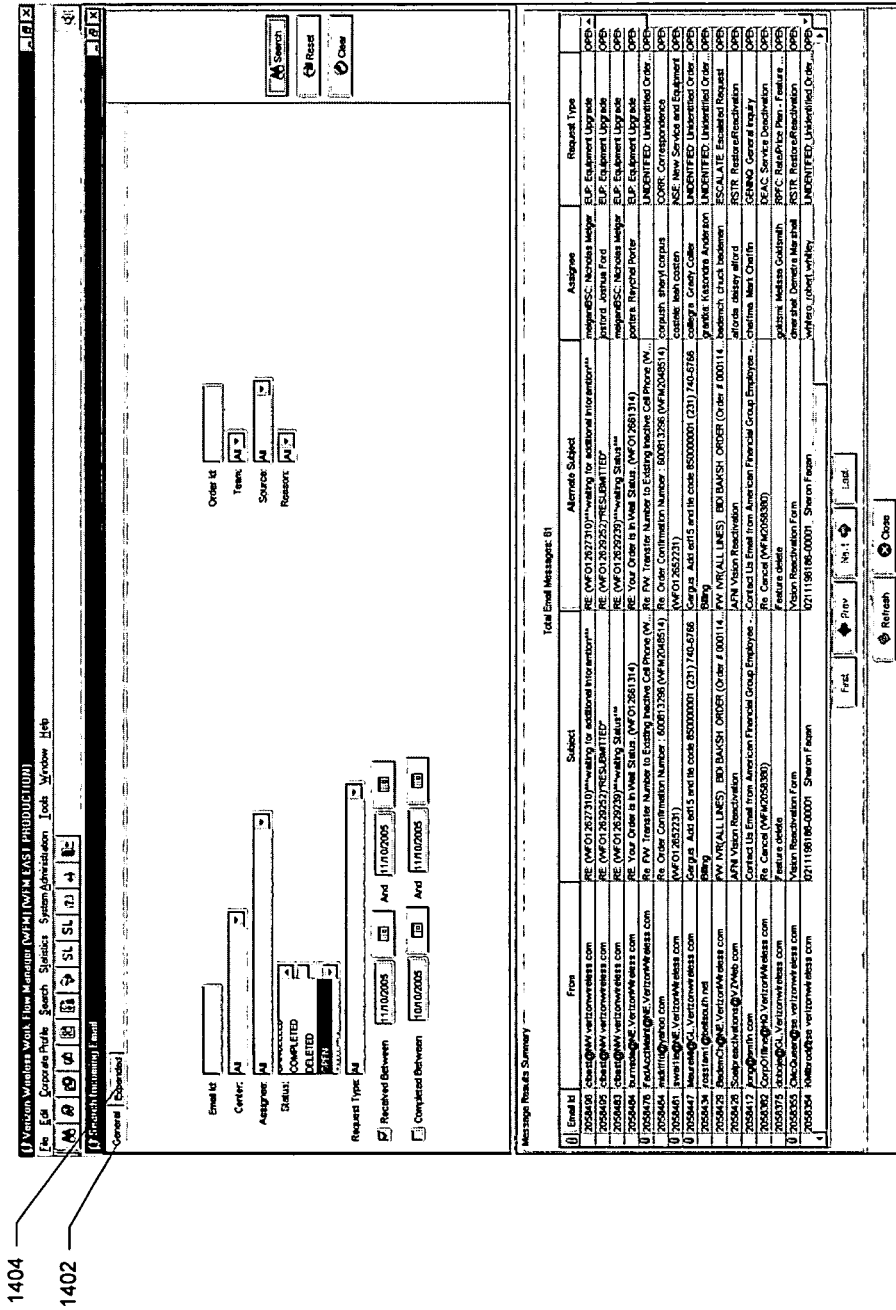

In one embodiment according to the invention, the WFM provides one or more screens such as the exemplary ones shown in FIG. 14*a* and FIG. 14*b* that allow the performance of searches for orders, emails and other work items. According to an exemplary embodiment, a general search tab 1402 and an expanded search tab 1404 are displayed by the GUI to a user, depending on the extensiveness of their search needs. FIGS. 14*a* and 14*b* illustrate exemplary general search tabs 1402 used in an embodiment according to the present invention. Orders and emails may be stored in memory accessible by the WFM for searching for a designated period of time. For instance, a rolling 13 months of orders and emails may be kept online and fully accessible by the business for searching. Because of the need to make frequent order and email searches, these functions may be available as hotkeys on a toolbar associated with the WFM.

Figure 15:
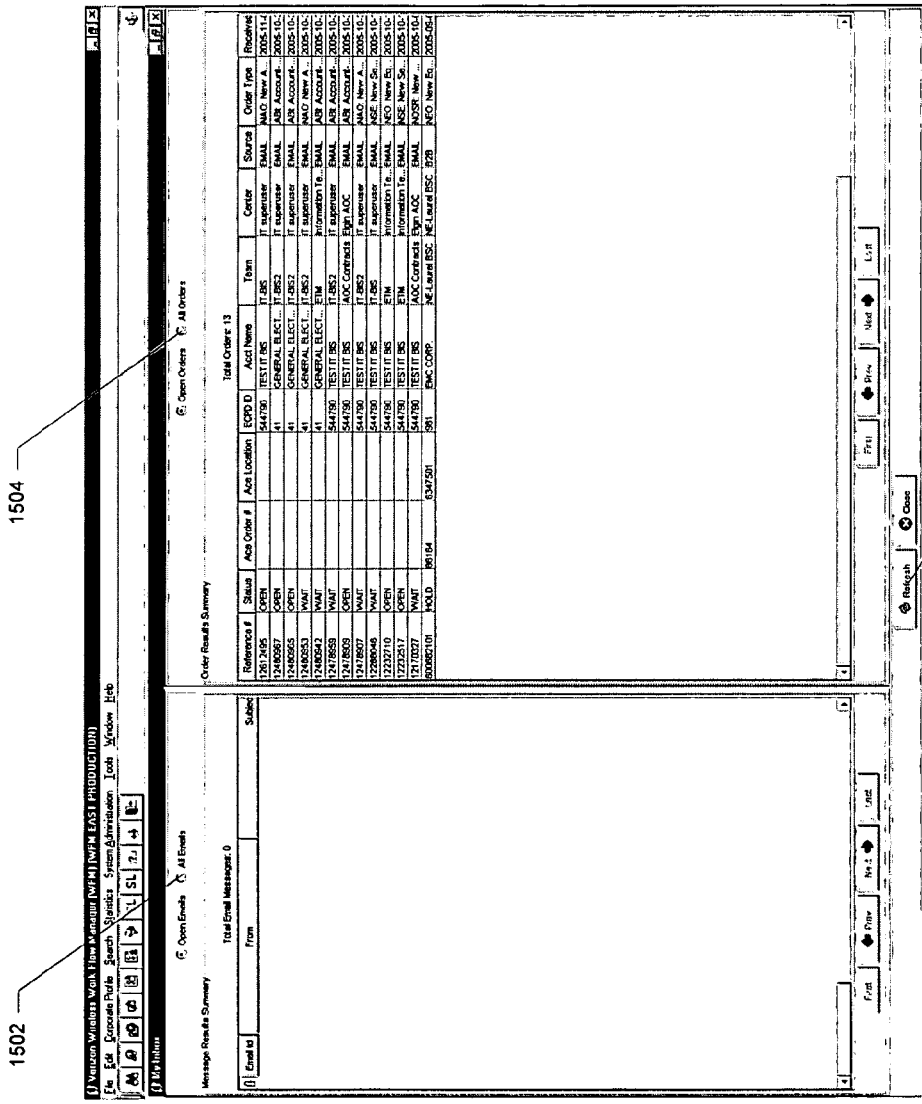
FIG. 15 illustrates an exemplary screen that is displayed by the GUI and is available from the WFM toolbar or by a hotkey, which allows the customer service representative to quickly see any outstanding emails and orders that are OPEN in their inbox and need to have action taken in an embodiment according to the present invention.

In one embodiment according to the present invention, the WFM provides users with the functionality to allow each user such as, for example, a customer service representative (CSR) to see emails, orders and other pieces of work in the CSR's electronic inbox. FIG. 15 illustrates an exemplary screen that is displayed by the GUI and is available from the WFM toolbar or by a hotkey, which allows the customer service representative to quickly see any outstanding emails and orders that are OPEN in their inbox and need to have action taken in an embodiment according to the present invention. In the exemplary screen of FIG. 15, a radio button 1502 for emails, and a radio button 1504 for orders with a refresh button 1506, allows a user to quickly see all the emails and orders they have worked in the past 90 days or other user-defined time period.

Figure 16:
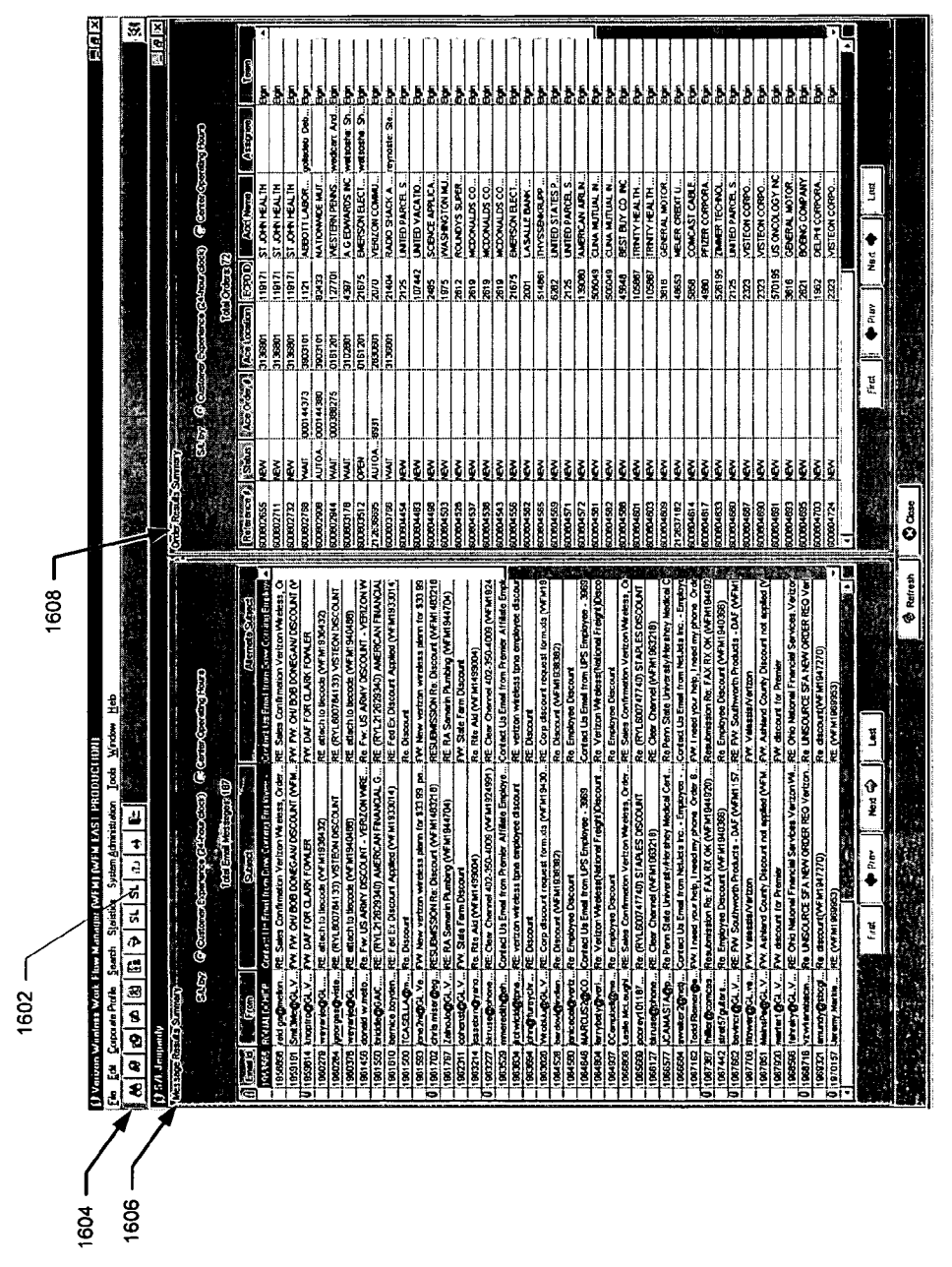

Another exemplary option that is available in an embodiment according to the invention is functionality to see emails, orders and other pieces of work in jeopardy of not meeting their service level commitment, as shown in FIG. 16. In an exemplary embodiment, an icon 1602 on the WFM toolbar 1604 or a hotkey or any other means of executing an application through the GUI allow a CSR or user to quickly view emails, orders and other pieces of work that are in jeopardy of missing their service level commitment, or that have missed their service level commitment. Service level commitment is a timeframe assigned to a piece of work in which some action should be taken on the piece of work. For instance, it may be the timeframe in which a customer request should be completed. In an exemplary embodiment, a screen as shown in FIG. 16 is displayed to a user through the GUI that on one side 1606 of the screen shows the business team any emails associated with that business team that are in jeopardy of not meeting their service level commitment based upon the customer experience (when the customer initiated the first email). On the other side, 1608, of this exemplary screen are business orders that have been sent in, and are in jeopardy of not meeting their service level commitment based upon the customer experience (again, when the order was initially sent). Pieces of work such as emails and orders can be sorted to see those in jeopardy of meeting their service level based upon the center operating hours. From this exemplary screen in FIG. 16, a user can "click" on, or otherwise select, any piece of work to see details associated with the selected piece of work. Establishing service level commitments and their associated jeopardy thresh-holds for work items is generally controlled by an organization's business team, based upon business rules that consider the center, source, order type, email status, or other parameters associated with a work item and deemed important by the business organization. This aspect of an embodiment of the WFM allows attention to be focused on work items assigned an importance by the business organization, while allowing some uniqueness based upon the centers, teams and individual users with an organization.

Unidentified Work Items

Figure 17:
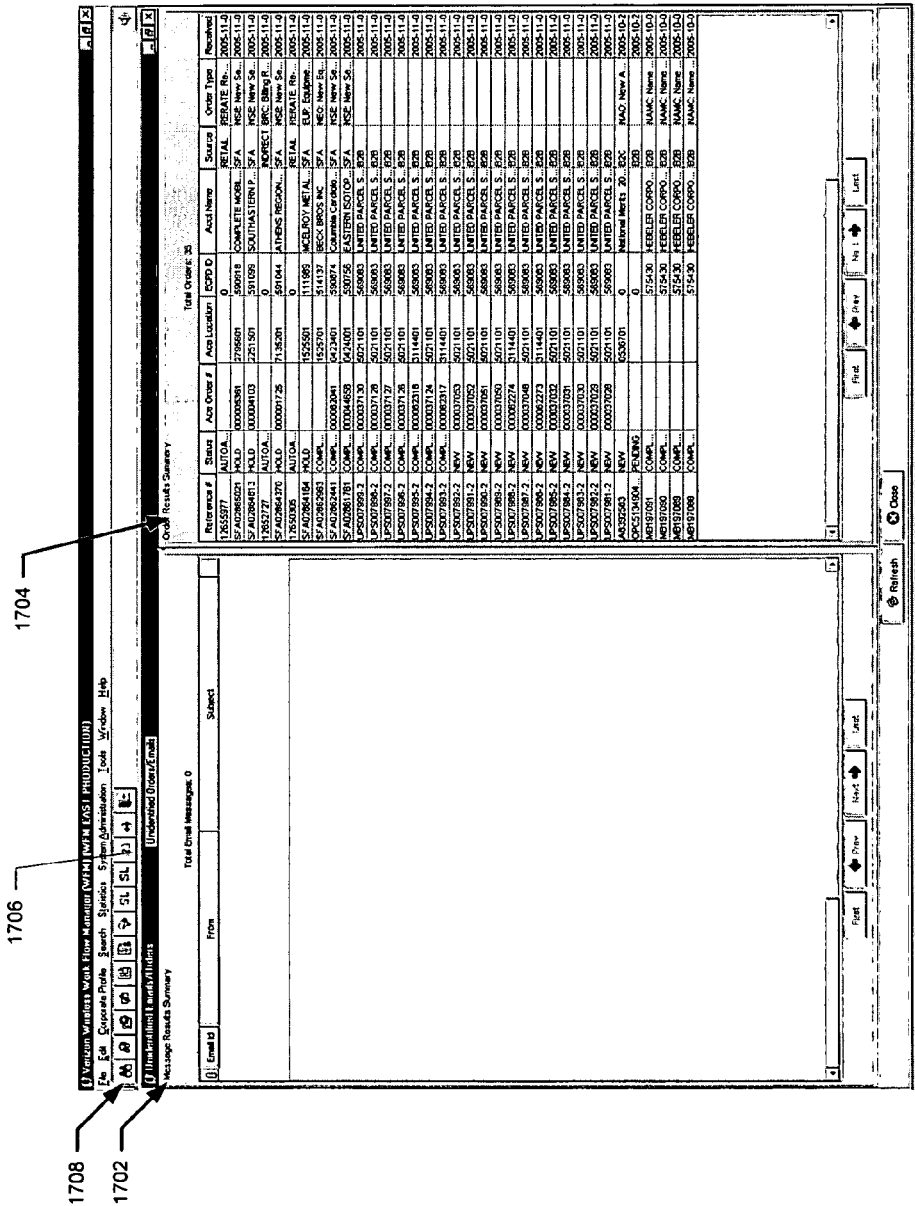
FIG. 17 is an exemplary screen that is displayed by the GUI and allows a user see mails, orders and other work items that have been placed in an "unidentified" queue, in an embodiment according to the invention.

Another exemplary option available in an embodiment according to the invention is an ability to display by the GUI of emails, orders and other work items that have been placed in an "unidentified" queue as shown in the exemplary screen of FIG. 17. If the WFM cannot determine an assignment of a work item such as, for example, a team assignment, based on existing business rules, then the WFM places the work item in an unidentified queue. As shown in the exemplary screen of FIG. 17, unidentified emails 1702 are displayed on the on the left-hand side, and unidentified orders 1704 are displayed on the right-hand side, though other forms of arranging unidentified work items are contemplated under the scope of this invention. A hot button 1706 on the WFM toolbar 1708, allows a user to see any work items that are in the unidentified queue. A representative of the business may then modify the business rules by assigning the work item to the proper center, team or CSR and further refining the routing rules to prevent similar future work items from going to the unidentified queue.

Near Real-Time Statistics and Reporting Functionality

Figure 18:
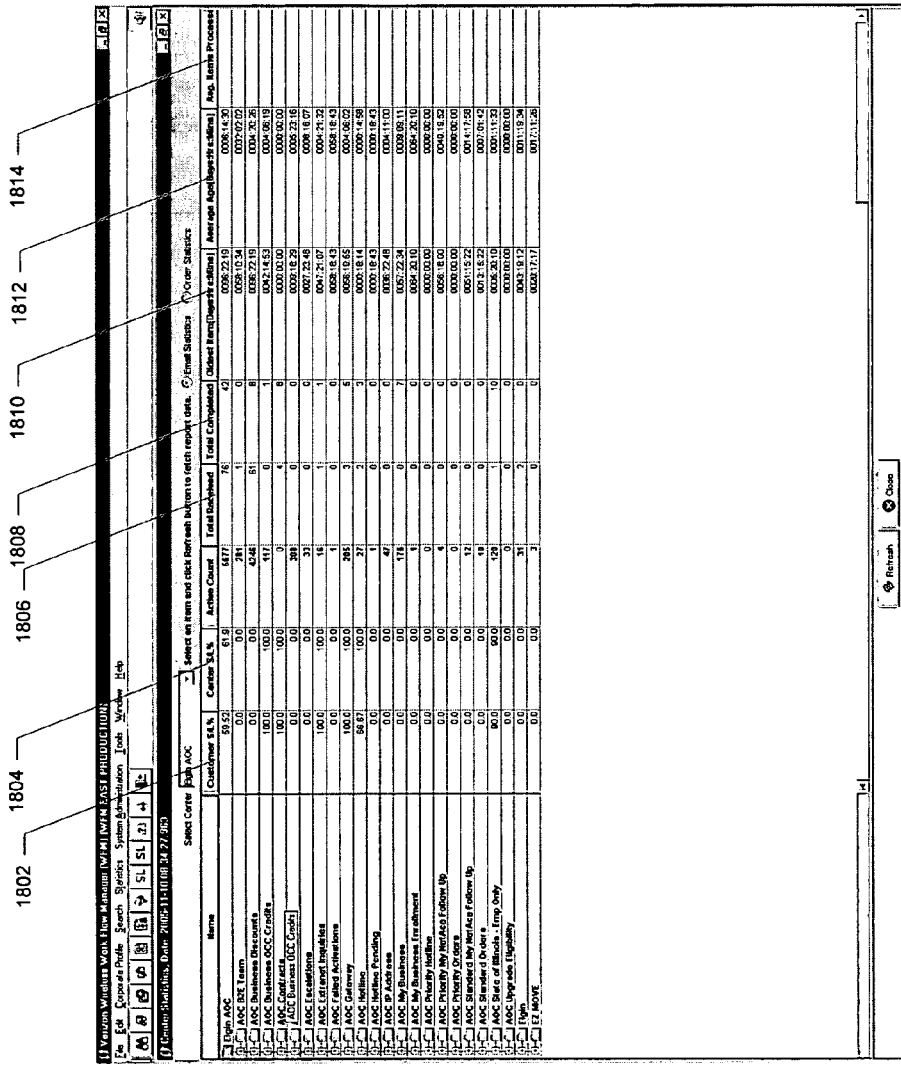
FIG. 18 is an exemplary screen displayed by the GUI that shows a number of statistics relative to the center, and each team defined under that center, for the current day, in an embodiment according to the present invention.
Figure 19:
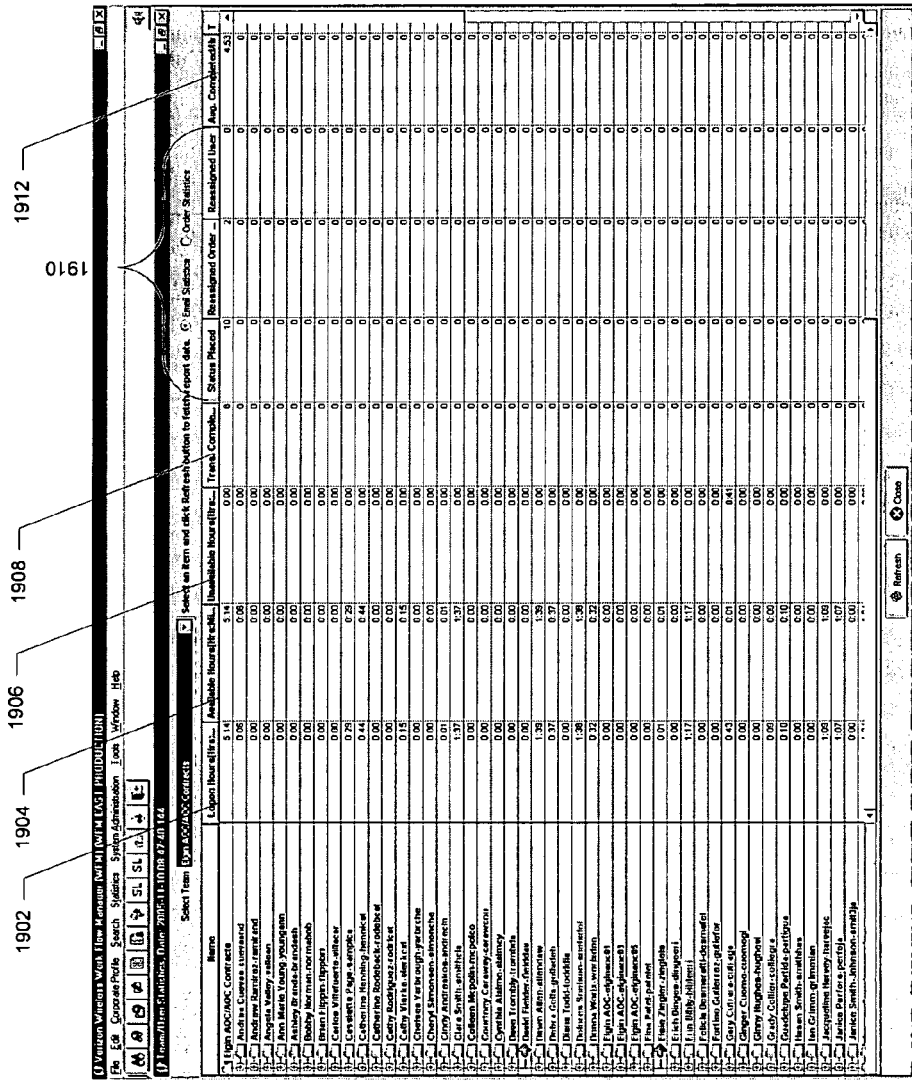
FIG. 19 is an exemplary screen displayed by the GUI that shows a number of near real-time statistics relative to the team and each user assigned to that team for the current day, in an embodiment according to the present invention.

Another exemplary option available in an embodiment according to the invention is the ability to determine and display through the GUI the near real-time statistics of work items being processed through the WFM at various hierarchical levels such as, for example, the center level, team level and CSR level. FIG. 18 is an exemplary screen displayed by the GUI that shows a number of statistics relative to the center, and each team defined under that center, for the current day. This function may be available as a hotkey on the WFM toolbar. In FIG. 18, the following real-time statistics are shown on this exemplary screen: percentage of emails, orders or other work items categorized by center/team/order type that have met the customer service level 1802; percentage of emails, orders and other work items categorized by center/team/order type that have met the center's assigned service level 1804; total work items (e.g., emails/orders) received 1806; total work items (e.g., emails/orders) completed 1808; oldest work item in queue 1810; average age of a work item in queue 1812; average items processed per hour 1814; and total customer service reps logged on (not shown in FIG. 18). FIG. 19 is an exemplary screen displayed by the GUI that shows a number of near real-time statistics relative to the team and each user assigned to that team for the current day. This screen of FIG. 19 assists an organization's management team in determining the productivity levels per customer service representative. The function of determining and displaying the statistics shown on the screen of FIG. 19 may be available as a hotkey on the WFM toolbar. The following near real-time statistics are available on the screen of FIG. 19: total hours the user has been logged onto WFM 1902; total hours the user has been available to accept new work in WFM 1904; total hours the user has been unavailable to accept work in WFM 1906; total transactions completed per user 1908; total transactions the user has reassigned 1910; average number of transactions completed per hour by the user 1912; the user's total handle time for all transactions (no shown FIG. 19); and the user's average handle time based upon the number of transactions worked (not shown FIG. 19). In one embodiment of the screen according to FIG. 19, a color scheme is employed to facilitate management review. For example, green may denote that the user is logged on and available to accept new work, while orange may denote the user is logged on but unavailable to accept new work, and red may denote that the user is not logged on.

Electronic Response to Work Items

Figure 20:
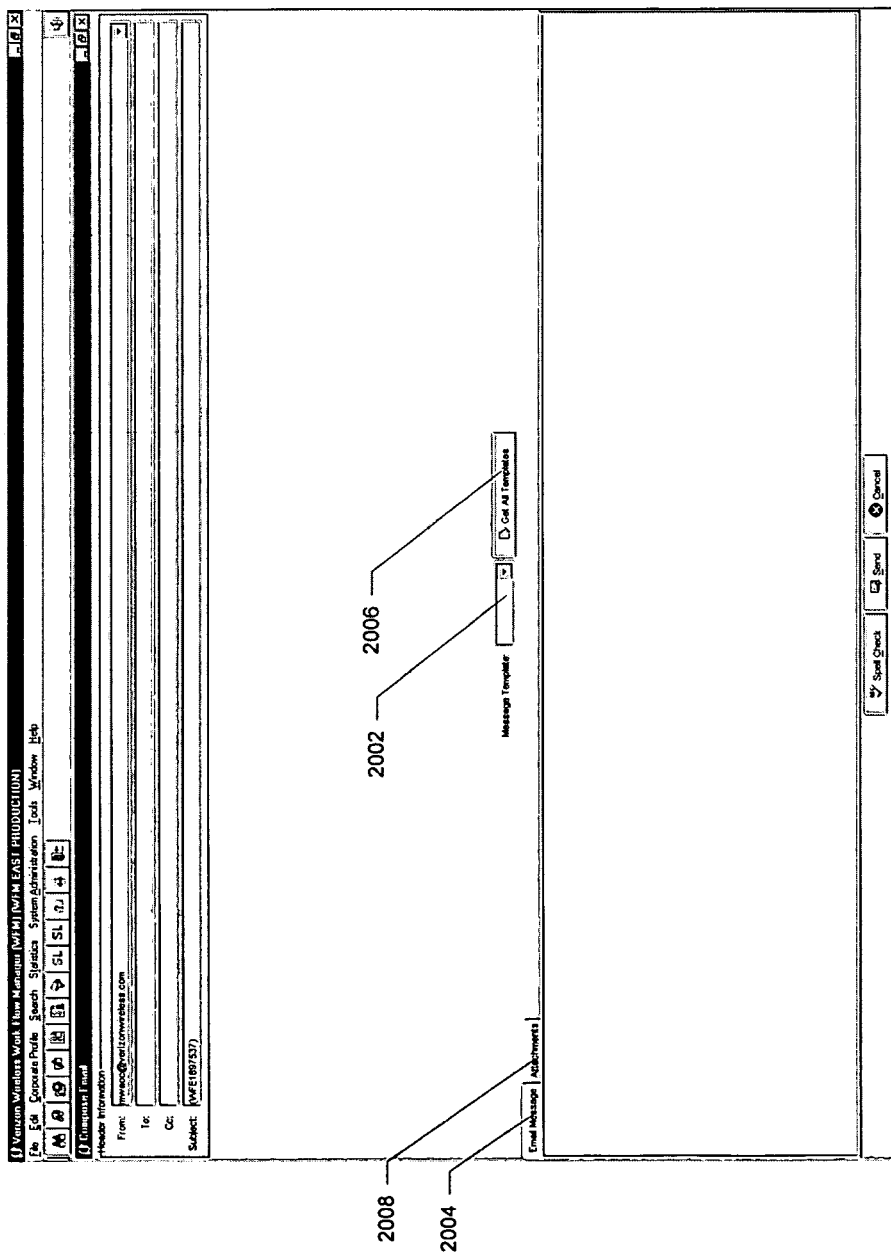
FIG. 20 is an exemplary standard screen for composing a response email related to a work item in an embodiment according to the present invention.

In one exemplary option of the WFM, a user has the ability to compose an electronic mail message (email) in response to a work item. In some instances a customer service representatives may receive a work item for which they need more information. The compose email functionality, allows the user to send an email back to the originator of the work item without divulging the user's personal email identifier. This response email can be pulled from a standard template that has been built for the center, team or user, or the user may key the email freeform. Once the email is completed, spell checks are performed to ensure validity; the email is sent and associated to the original work item, so at a glance any user or manager can view all correspondence related to any work item. FIG. 20 is an exemplary standard screen for composing a response email related to a work item.

In one embodiment, the WFM will automatically generate and send an auto-acknowledgment email for all work items (e.g., emails) sent to the WFM-monitored email boxes UNLESS the incoming work item's "From" Internet domain or email address is set up as a correspondence exception, as previously described. If the "CC Recipient option" has been selected, the auto-acknowledgement email will also be sent to any CC addresses in the incoming work item. The auto-acknowledgement email will be visible in the outgoing emails tab 306 in the email details screen (see FIG. 3).

Users also have the ability to manually respond to a work item. Referring again back to FIG. 3, a user may send an email to the originator of a work item from the WFM by selecting the Reply or Reply to All button in the assignment information section 316 of the email details screen (FIG. 3). Correspondingly, a compose email screen as shown in FIG. 20 is displayed by the GUI to the user. If the user desires to use a standard template to respond to the work item, then the user may select the desired email template in the Message Template dropdown 2002. The template will be populated in the Email Message tab 2004. The user has the option of modifying the template prior to sending the email while the message is displayed in the email message tab 2004. If the desired template is not displayed in the Message Template dropdown 2002, the user may select the Get All Templates button 2006, which will bring up a template selection box where the user can view and select the template he/she wants to use. The chosen template will be populated in the Email Message tab 2004 and, as above, the user has the option of modifying the template prior to sending the email.

A user may also type free-form text in the Email Message tab 2004 without selecting any template first. Attachments may be attached to and sent with an email by using the Attachments tab 2008. Similar to other email systems as known in the art, the user my browse files for the attachment(s). Once sent, an email will be visible in the Outgoing Emails tab 306 in the Email Details screen (see FIG. 3).

Methods of Use

Figure 21:
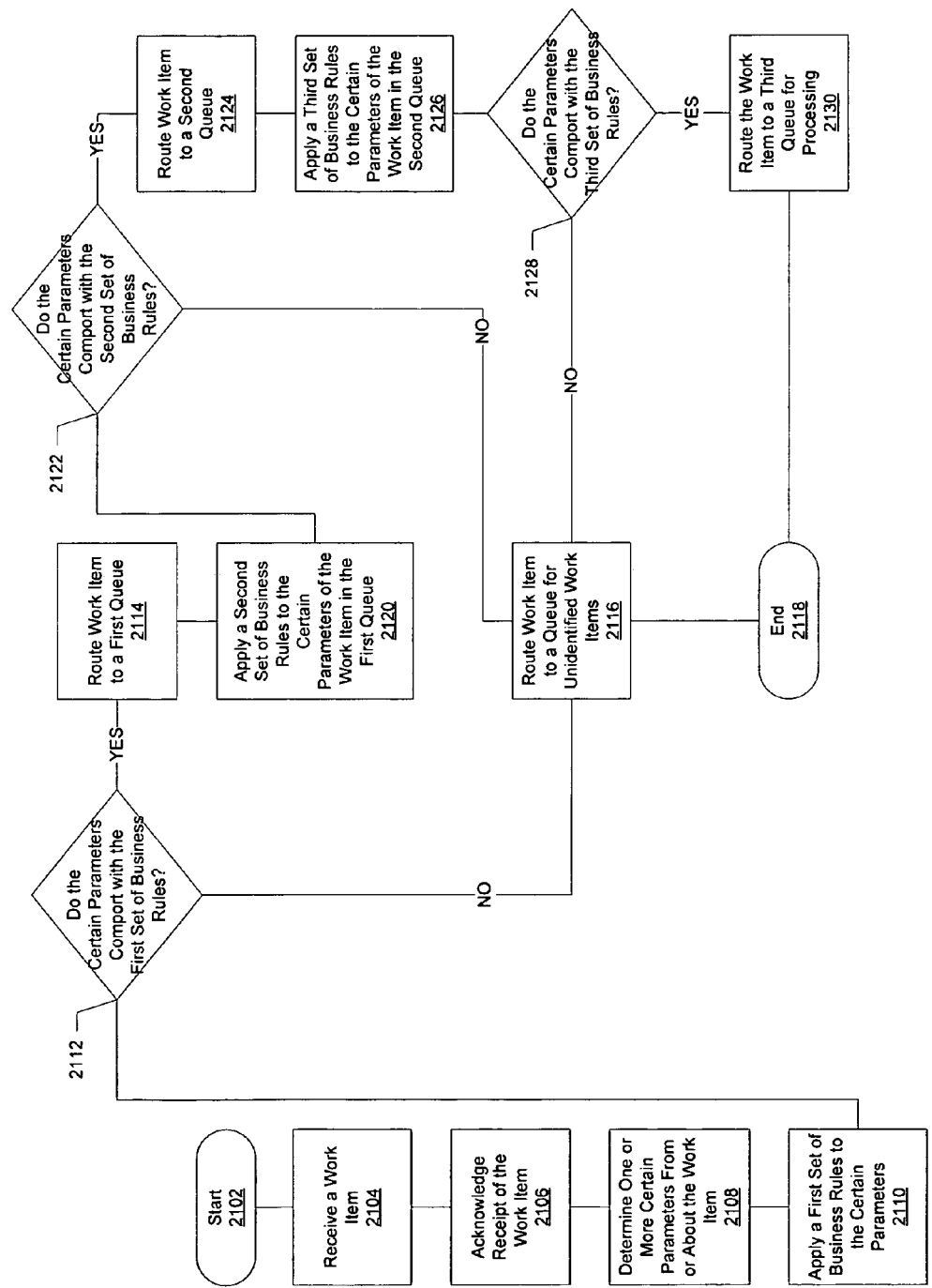
FIG. 21 is an exemplary flowchart for a method for utilizing an embodiment of a workflow manager according to the present invention.

FIG. 21 is an exemplary flowchart for a method for utilizing an embodiment of a workflow manager according to the present invention. The process of FIG. 21 starts at step 2102. At step 2104, a workflow management system electronically receives a work item. At step 2106, the workflow manager automatically and electronically acknowledges receipt of the received work item to a designated party. At step 2108, the workflow manager determines one or more certain parameters from or about the work item. At step 2110 a first set of business rules are applied to the one or more certain parameters. At step 2112, it is determined whether the certain parameters comport with a first set of business rules. If, at step 2112, the certain parameters do comport with the first set of business rules, then the process goes to step 2114, where the work item is routed to a first electronic queue of the workflow manager. If, at step 2112, the certain parameters do not comport with the first set of business rules, then at step 2116 the work item is routed to an electronic queue for unidentified work items and the process ends at step 2118. Returning to the work item routed to the first electronic queue at step 2114, at step 2120 a second set of business rules are applied to the one or more certain parameters of the work item in the first electronic queue. At step 2122 it is determined whether the certain parameters comport with the second set of business rules. If so, then the work item is routed to a second electronic queue at step 2124. If not, then the work item is routed to the electronic queue for unidentified work items at step 2116 and the process ends at step 2118. At step 2126, a third set of business rules are applied to the certain parameters of the work item in the second electronic queue. At step 2128 it is determined whether the certain parameters comport with the third set of business rules. If so, then at step 2130 the work item is routed to a third electronic queue where it is processed by a user of the workflow manager and the process ends at step 2118. If not at step 2128, then the work item is routed to the electronic queue for unidentified work items at step 2116 and the process ends at step 2118.

It is to be appreciated in the above process and from the description of the system that the referenced work item may be, for example, an email or an order for a service and/or device and that the designated party that is notified of the receipt of the work item may be the originator of the work item. It is further to be appreciated that the first electronic queue may be associated with a center of a business organization, the second electronic queue may be associated with a team that is a member of the center, and that the third electronic queue may be associated with a customer service representative that is a member of the team. In one embodiment, it is to be appreciated that the workflow manager may be used by a wireless telecommunications provider to provide telecommunications services or telecommunications devices to customers.

Figure 22:
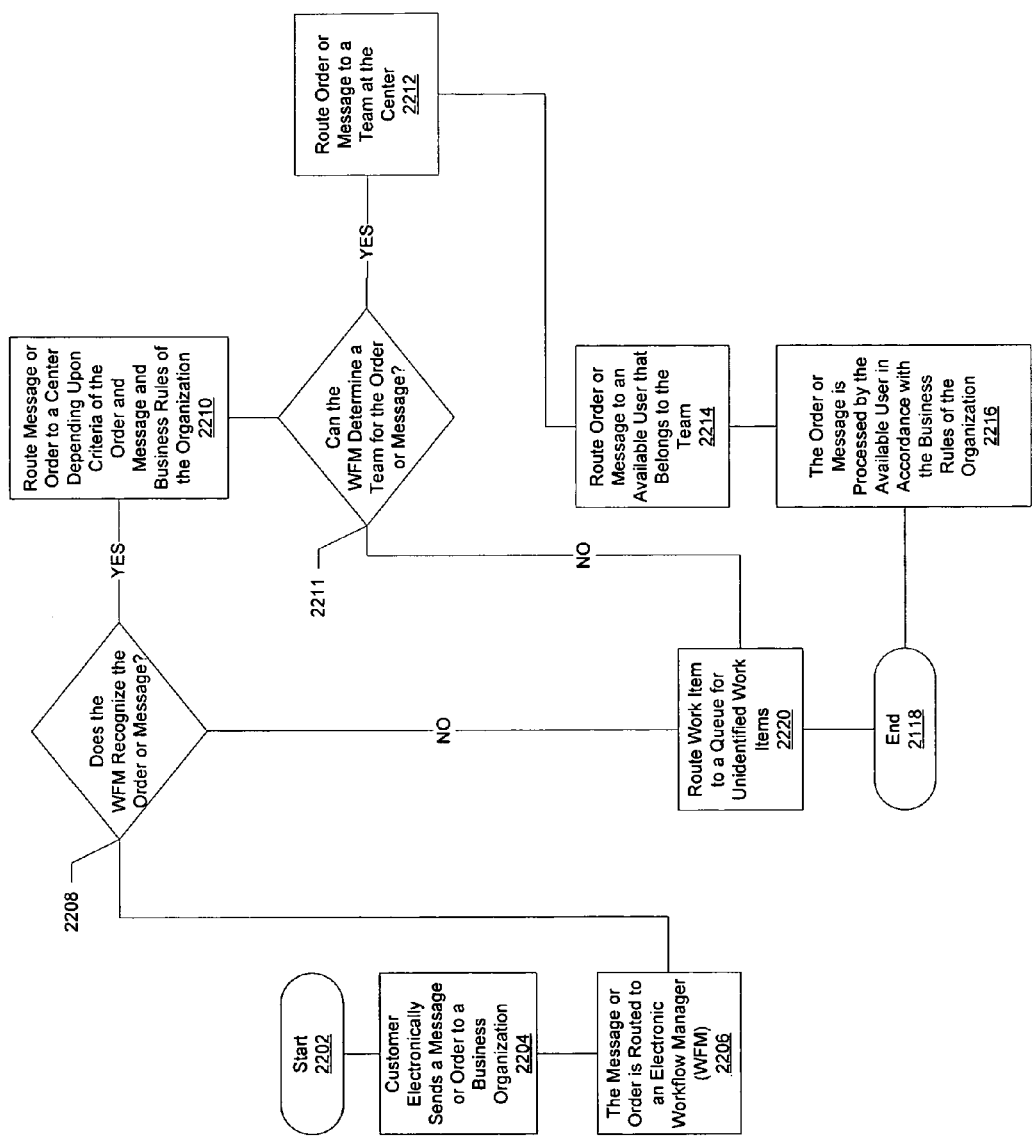
FIG. 22 is another exemplary flowchart for a method for utilizing an embodiment of a workflow manager according to the present invention.

FIG. 22 is another exemplary flowchart for a method for utilizing an embodiment of a workflow manager according to the present invention. The process of FIG. 22 starts at step 2202. At step 2204, a customer electronically sends an order or a message to a business organization. At step 2206, the order or message is routed to an electronic workflow manager associated with the business organization. At step 2208, it is determined whether the workflow manager recognizes the message or order based on the business rules of the organization. If so, then the process goes to step 2210, where the workflow manager receives the order or the message and depending upon various criteria, which include the originator of the order or message or text contained within the order or message and the business rules of the business organization, the order or message is routed to a center. At step 2211, the WFM attempts to determine a team at the center to route the work item to. If at step 2211, no team can be determined, then the work item is routed to an unidentified queue at step 2220. If at step 2211a team can be determined for the work item, then at step 2212, once received by a center, the order or message is routed to a team at that center. At step 2214, the order or message is routed to an available user and at step 2216 the user processes the order or message in accordance with business rules of the organization. The process then ends at step 2218. If the order or message is not recognized by the workflow manager at step 2208, then at step 2220 it is routed to an unidentified queue where the order is reviewed and the criteria and the business rules may be modified to recognize similar future orders or messages and the process ends at step 2218.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising steps of:
   electronically receiving a work item at an electronic workflow manager, from an originator;
   in response to the receipt of the work item, automatically and electronically sending an acknowledgement of the received work item to the originator of the work item;
   determining one or more parameters from or about the received work item;

applying the one or more parameters to business rules defined for determining one or more customer service representatives to assign to the work item, wherein a plurality of customer service representatives belong to a team, a plurality of teams are at a center, and a plurality of centers belong to a business enterprise; wherein the business rules comprise multiple sets of business rules, each set of business rules corresponding to a respective customer service representative, team, and center; wherein rules of each set of business rules for a customer service representative are more specific than those for a team and rules of each set of business rules for a team are more specific than those for a center;

if said one or more parameters comport with the applied business rules, then:
A) sequentially performing the following steps:
1) automatically determining, based upon the application of a first set of the business rules to said one or more parameters of said work item, a center from amongst the plurality of centers belonging to the business enterprise;
2) automatically determining, based upon the application of a second set of the business rules to said one or more parameters of said work item and based on the determined center, a team at the determined center;
3) automatically determining, based upon the application of a third set of the business rules to said one or more parameters of said work item and based on the determined team, one or more customer service representatives from the plurality of customer service representatives of the determined team, for processing said work item; and
4) automatically determining if any of the determined one or more customer service representatives are available and routing said work item to an available customer service representative for processing said work item, while if none of the determined one or more customer service representatives are available, then holding said work item in an electronic queue until at least one of the determined one or more customer service representatives becomes available, and routing said work item to one of the determined customer service representatives that has become available, for processing said work item; and
B) performing the following steps:
determining a correspondence type associated with the work item and one or more of the team, the center, or the business enterprise to which the work item is routed; and
electronically sending a message related to the processing of the work item as a result of the routing of the work item, to the originator of the work item, in a message template associated with the determined correspondence type; and if said one or more parameters do not comport with at least one of the applied business rules in steps 1), 2) and 3), then:
5) routing said work item to an electronic queue for unidentified work items; and
6) after said routing of said work item:
A) assigning the unidentified work item to a selected center from amongst the plurality of centers, a selected team at the selected center, or a selected customer service representative at the selected team, wherein all work items routed to the electronic queue for unidentified work items are assigned; and
B) modifying, when determined by a representative of the business, the at least one of the applied business rules in steps 1), 2) and 3) based on attributes of the unidentified work items in the electronic queue, such that said one or more parameters of said work item in said electronic queue for unidentified work items comports with the at least one modified business rule and therefore future received work items having similar attributes to the unidentified work items in the electronic queue will not be routed to the electronic queue for unidentified work items.

2. The method of claim 1, wherein businesses rules include one of more of keywords, an email address, a corporate database, a service market, and a fulfillment location.

3. The method of claim 1, wherein said work item is one of an electronic message, an order for services, an order for a device, or an order for services and a device.

4. The method of claim 1, wherein said one or more parameters from or about the work item include one or more of an Internet domain from which the work item originated, an email address from which the work item originated, and key words, phrases or codes contained within the work item.

5. The method of claim 1, wherein if more than one customer service representative is determined to be available to process the work item, a customer service representative available for a longest period of time is assigned the work item.

6. The method of claim 1, further comprising steps of:
assigning the work item a service level commitment based on a timeframe for processing the work item,
monitoring the work item and its assigned service level commitment, and
reporting the work item if it is in jeopardy of not meeting its assigned service level commitment or has missed its assigned service level commitment.

7. A method, comprising steps of:
electronically receiving a work item at an electronic workflow manager, from an originator;
in response to the receipt of the work item, automatically and electronically sending an acknowledgement of the received work item to the originator of the work item;
determining one or more parameters from or about the received work item;
A) sequentially performing the following steps:
1) automatically and electronically applying the one or more parameters of the work item to a first set of business rules that define attributes of a first electronic queue associated with a center of a business enterprise and if said one or more parameters comport with said first set of business rules, then routing said work item to the first electronic queue, and if said one or more parameters do not comport with said first set of business rules, then routing said work item to an electronic queue for unidentified work items and after said routing of the work item: A) assigning the unidentified work item to a selected center from amongst a plurality of centers, wherein all work items routed to the electronic queue for unidentified work items are assigned, and B) modifying, when determined by a representative of the business, said first set of business rules based on attributes of the unidentified work items in the electronic queue, such that said one or more parameters of said work item in said electronic queue for unidentified work items comports with said modified first set of business rules and therefore future received work items having similar attributes to the unidentified work items in the electronic queue will not be routed to the electronic queue for unidentified work items;

2) automatically and electronically applying the one or more parameters of the work item in the first electronic queue to a second set of business rules that define attributes of a second electronic queue associated with a team of the center and if said one or more parameters comport with said second set of business rules, then routing said work item from the first electronic queue to the second electronic queue, and if said one or more parameters do not comport with said second set of business rules, then routing said work item to the electronic queue for unidentified work items and after said routing of the work item: A) assigning the unidentified work item to a selected team from amongst a plurality of teams, wherein all work items routed to the electronic queue for unidentified work items are assigned, and B) modifying, when determined by a representative of the business, said second set of business rules, based on attributes of the unidentified work items in the electronic queue such that said one or more parameters of said work item in said electronic queue for unidentified work items comports with said modified second set of business rules and therefore future received work items having similar attributes to the unidentified work items in the electronic queue will not be routed to the electronic queue for unidentified work items;

3) automatically and electronically applying the one or more parameters of the work item in the second electronic queue to a third set of business rules that define attributes of a third electronic queue associated with a customer service representative of the team and if said one or more parameters comport with said third set of business rules, then routing said work item from the second electronic queue to the third electronic queue to await processing by an available customer service representative, and if said one or more parameters do not comport with said third set of business rules, then routing said work item to the electronic queue for unidentified work items and after said routing of the work item: A) assigning the unidentified work item to a selected customer service representative from amongst a plurality of customer service representatives, wherein all work items routed to the electronic queue for unidentified work items are assigned, and B) modifying, when determined by a representative of the business, said third set of business rules, based on attributes of the unidentified work items in the electronic queue such that said one or more parameters of said work item in said electronic queue for unidentified work items comports with said modified third set of business rules and therefore future received work items having similar attributes to the unidentified work items in the electronic queue will not be routed to the electronic queue for unidentified work items; and B) performing the following steps:
determining a correspondence type associated with the work item and one or more of the first electronic queue, the second electronic queue, or the third electronic queue to which the work item is routed, and electronically sending a message related to the processing of the work item as a result of the routing of the work item, to the originator of the work item, in a message template associated with the determined correspondence type, wherein:

the initially determined one or more parameters establish whether or not the work item is routed from the first electronic queue to the second electronic queue and from the second electronic queue to the third electronic queue, and the third set of business rules are more specific than the second set of business rules, and the second set of business rules are more specific than the first set of business rules, to enable delivery of the work item to the most appropriate queue for completing the work item.

8. The method of claim 7, wherein said work item is one of an electronic message, an order for services, an order for a device, or an order for services and a device.

9. The method of claim 7, wherein said one or more parameters from or about the work item include one or more of an Internet domain from which the work item originated, an email address from which the work item originated, and key words, phrases or codes contained within the work item.

10. The method of claim 7, wherein one or more of the first set of businesses rules, the second set of business rules, and the third set of business rules includes one of more of keywords, an email address, a corporate database, a service market, and a fulfillment location.

11. The method of claim 7, further comprising assigning the work item a service level commitment based on a timeframe for processing the work item, monitoring the work item and its assigned service level commitment and reporting the work item if it is in jeopardy of not meeting its assigned service level commitment or has missed its assigned service level commitment.

12. The method of claim 7, wherein said first electronic queue is associated with a center that comprises a portion of a business enterprise.

13. The method of claim 12, wherein said second electronic queue is associated with a team that comprises a portion of the center.

14. The method of claim 13, wherein said third electronic queue is associated with the customer service representative that comprises a portion of the team.

15. A system operating on one or more computing devices, said system comprised of:
an import server, wherein said import server receives one or more work items that are sent to a business organization and stores said one or more work items at least momentarily on a database, wherein the business organization is comprised of a plurality of centers, a plurality of teams at each center, and a plurality of customer service representatives on each team;

a module configured to automatically and electronically send an acknowledgement of the received work item to the originator of the work item, in response to the receipt of the work item;

a routing engine, wherein said routing engine discerns information from and about each of said one or more work items, applies business rules to said information, the business rules defined for determining one or more customer service representatives customer service representatives for processing the one or more work items, wherein the business rules comprise multiple sets of business rules and each set of the business rules corresponds to a respective customer service representative, team and center, wherein rules of each set of business rules for a customer service representative are more specific than those for a team and rules of each set of business rules for a team are more specific than those for a center, wherein:

based upon said information comporting with said business rules said routing engine:

sequentially performing the following steps:
1) automatically determines based upon the application of a first set of business rules to said one or more parameters of said work item, a center from amongst the plurality of centers belonging to the business organization, for processing each work item,
2) automatically determines, based upon the application of a second set of business rules to said one or more parameters of said work item and based on the determined center, a team at the determined center;
3) automatically determines, based upon the application of a third set of business rules to said one or more parameters of said work item and based on the determined team, one or more customer service representatives from the plurality of customer service representatives of the determined team, for processing each work item, and
4) automatically routing each work item to an available one of the determined customer service representatives, for processing said work item, and if said information does not comport with at least one of said business rules in steps 1), 2) and 3), then:
5) routing engine routes each said work item to an unidentified work item electronic queue and
6) after said routing of said work item:
   A) assigning the unidentified work item to a selected center from amongst the plurality of centers, a selected team at the selected center, or a selected customer service representative at the selected team, wherein all work items routed to the electronic queue for unidentified work items are assigned; and
   B) modifying, when determined by a representative of the business, the at least one of the applied business rules in steps 1), 2) and 3) based on attributes of the unidentified work items in the electronic queue, such that said one or more parameters of said work item in said electronic queue for unidentified work items comports with the at least one modified business rules and therefore future received work items having similar attributes to the unidentified work items in the electronic queue will not be routed to the electronic queue for unidentified work items; and an application server, wherein the application server services one or more graphical user interfaces (GUIs) such that each respective one or more work item routed to a respective one available customer service representative is displayed to the respective one available customer service representative and the respective one available customer service representative may interact with and process the respective work item on a discrete and consolidated basis;

wherein said routing engine further processes each respective work item by determining a correspondence type associated with the work item and one or more of the team, the center, or the business organization to which the work item is routed, and electronically sends a message related to the processing of the work item as a result of the routing of the respective work item to an originator of the respective work item in a message template associated with the determined correspondence type; and wherein the import server, the routing engine, and the application server each comprise a memory device configured to store respective instructions and a processing device configured to execute the respective instructions.

16. The system of claim 15, wherein the routing engine determines which of one or more available customer service representatives to route each said one or more work items based upon periods of availability of the one or more available customer service representatives.

17. The system of claim 15, wherein:

the module comprises a templates and auto-acknowledgment module that acknowledges receipt of each respective work item by the business organization to the originator of the respective work item and further is configured to provide for an available customer service representative to electronically communicate with the originator of the respective work item, and the templates and auto-acknowledgment module comprises a memory device configured to store instructions for the templates and auto-acknowledgment module and a processing device configured to execute the templates and auto-acknowledgment module instructions.

18. The system of claim 17, wherein the electronic communication with the originator of the respective work item is via email using pre-existing templates.

19. The system of claim 15, further comprising:

a tracking module, wherein each respective one of said one or more work items is assigned a service level commitment based on a timeframe for processing the respective work item, said tracking module monitors work items and their assigned service level commitments and provides an alert if any one work item is in jeopardy of not meeting its assigned service level commitment or has missed its assigned service level commitment, wherein the tracking module comprises a memory device configured to store instructions for the tracking module and a processing device configured to execute the tracking module instructions.

20. The system of claim 15, further comprising:

a reporting module configured to provide discrete and cumulative statistical reports on the one or more work items received by the business organization, the processing of the one or more work items by the system, and the one or more customer service representatives of the system, wherein the reporting module comprises a memory device configured to store instructions for the reporting module and a processing device configured to execute the reporting module instructions.

21. The system of claim 15, further comprising:

a business applications module that is configured to interface with business applications of the business organization such that actions taken in response to the one or more work items by the business applications may be tracked and reported by the system, wherein the business applications module comprises a memory device configured to store instructions for the business applications module and a processing device configured to execute the business applications module instructions.

22. A computer program product, comprising:

a non-transitory computer memory having computer readable code embodied therein, for execution by a computing device, for processing a work item using an electronic workflow manager, said code comprising:

a) executable code for electronically receiving a work item from an originator;
b) executable code for automatically and electronically sending an acknowledgement of the received work item to the originator of the work item, in response to the receipt of the work item;
c) executable code for determining one or more parameters from or about the received work item;
d) executable code for applying the one or more parameters to business rules defined for determining one or more customer service representatives to assign to the work item, wherein a plurality of customer service representatives belong to a team, a plurality of teams are at a center, and a plurality of centers belong to a business enterprise; wherein the business rules comprise multiple sets of business rules, each set of business rules corresponding to a respective customer service representative, team, and center; wherein rules of each set of business rules for a customer service representative are more specific than those for a team and rules of each set of business rules for a team are more specific than those for a center;
e) executable code for determining if said one or more parameters comport with said business rules;
sequentially performing the following executable code:
f) executable code for automatically determining, based upon the application of a first set of business rules to said one or more parameters of the work item, a center from amongst the plurality of centers belonging to the business enterprise;
g) executable code for automatically determining, based upon the application of a second set of business rules to said one or more parameters of the work item and based on the determined center, a team at the determined center;
h) executable code for automatically determining, based upon the application of a third set of business rules to said one or more parameters of the work item and based on the determined team, one or more customer service representatives from the plurality of customer service representatives of the determined team, for processing said work item if said executable code for determining if said one or more parameters comport with said business rules determines that said one or more parameters comport with said business rules;
i) executable code for, after determining the one or more customer service representatives, automatically determining if any of the determined one or more customer service representatives are available and routing said work item to an available customer service representative for processing said work item;
j) executable code for, while if none of the determined one or more customer service representatives are available, then holding said work item in an electronic queue until at least one of the determined one or more customer service representatives becomes available, and routing said work item to one of the determined customer service representatives that has become available, for processing said work item;
k) executable code for determining if said one or more parameters do not comport with at least one of the applied business rules in steps f), g) and h), and if so:
  1) routing said work item to an electronic queue for unidentified work items, and
  2) after said routing of said work item:
    2A) assigning the unidentified work item to a selected center from amongst the plurality of centers, a selected team at the selected center, or a selected customer service representative at the selected team, wherein all work items routed to the electronic queue for unidentified work items are assigned, and 2B) modifying, when determined by a representative of the business, the at least one of the applied business rules in steps 1), 2) and 3) based on attributes of the unidentified work items in the electronic queue, such that said one or more parameters of said work item in said electronic queue for unidentified work items comports with the at least one modified business rules, and therefore future received work items having similar attributes to the unidentified work items in the electronic queue will not be routed to the electronic queue for unidentified work items; and
l) executable code for determining a correspondence type associated with the work item and one or more of the team, the center, or the business organization to which the work item is routed, and electronically sending a message related to the processing of the work item as a result of the routing of the work item to the originator of the work item in a message template associated with the determined correspondence type.

* * * * *